(12) United States Patent
Furthmueller et al.

(10) Patent No.: US 8,686,609 B2
(45) Date of Patent: Apr. 1, 2014

(54) ELECTRICAL MACHINE

(75) Inventors: David Furthmueller, Mössingen (DE);
Syed Farhad Khurshid, Hemmingen (DE); Gianna Nario-Rivera, Dortmund (DE); Klaus Herbold, Asperg (DE); Ruediger Schroth, Renningen-Malmsheim (DE); Stefan Einbock, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 13/496,934

(22) PCT Filed: Sep. 17, 2010

(86) PCT No.: PCT/EP2010/063722
§ 371 (c)(1),
(2), (4) Date: Jun. 4, 2012

(87) PCT Pub. No.: WO2011/033079
PCT Pub. Date: Mar. 24, 2011

(65) Prior Publication Data
US 2012/0235525 A1 Sep. 20, 2012

(30) Foreign Application Priority Data
Sep. 17, 2009 (DE) .................. 10 2009 042 566

(51) Int. Cl.
*H02K 11/00* (2006.01)
(52) U.S. Cl.
USPC ........................................ 310/68 D; 310/71

(58) Field of Classification Search
USPC ............................................ 310/68 D, 71, 89
See application file for complete search history.

(56) References Cited

U.S. PATENT DOCUMENTS

| 5,883,450 | A | 3/1999 | Abadia et al. |
| 6,285,100 | B1 | 9/2001 | Pflueger et al. |
| 6,307,289 | B1 | 10/2001 | Skala |
| 7,183,677 | B2 * | 2/2007 | Ihata et al. ............. 310/62 |

(Continued)

FOREIGN PATENT DOCUMENTS

| JP | 2001231233 | 8/2001 |
| JP | 2004357451 | 12/2004 |

OTHER PUBLICATIONS

PCT/EP2010/063722 International Search Report dated Nov. 24, 2010 (Translation and Original, 4 pages).

*Primary Examiner* — Nguyen N Hanh
(74) *Attorney, Agent, or Firm* — Michael Best & Friedrich LLP

(57) ABSTRACT

The invention relates to an electrical motor (10), in particular an alternating current generator, having a housing (13) that has at least one bearing shield (13.2), having a rectifier device (139) which has an interconnection unit (144) that interconnects the current rectifier (147, 150) to a bridge circuit, characterized in that the interconnection unit (144) has at least one platform (295) that is oriented to the bearing shield (13.2) and the opening (40) is separated by at least one brace (340) which holds a hub (337), wherein the opening (40) has a niche (346) that is incorporated on the radial outer edge (349) of the opening and wherein the platform (295) projects into said niche (346) and a connection wire (216) exiting the platform (295) extends into the opening (40).

10 Claims, 21 Drawing Sheets

(56) References Cited

U.S. PATENT DOCUMENTS

| | | |
|---|---|---|
| 7,612,474 B2 | 11/2009 | DePetris et al. |
| 7,629,719 B2 * | 12/2009 | Hamada ...................... 310/68 D |
| 2004/0041476 A1 * | 3/2004 | Ihata et al. .................. 310/68 D |
| 2006/0017337 A1 | 1/2006 | Smith et al. |
| 2008/0061641 A1 * | 3/2008 | Koumura et al. ............... 310/71 |
| 2009/0167122 A1 * | 7/2009 | Schurig et al. .............. 310/68 D |
| 2010/0301690 A1 * | 12/2010 | De Filippis ...................... 310/64 |

* cited by examiner

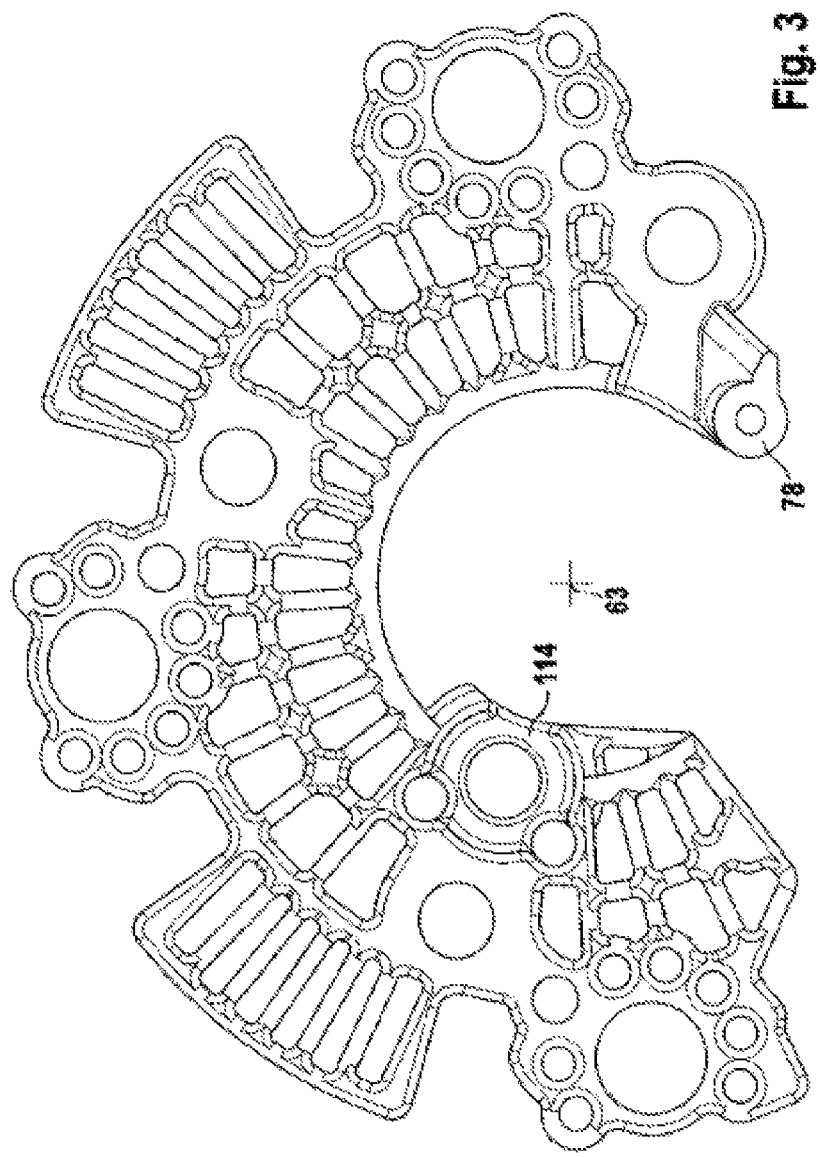

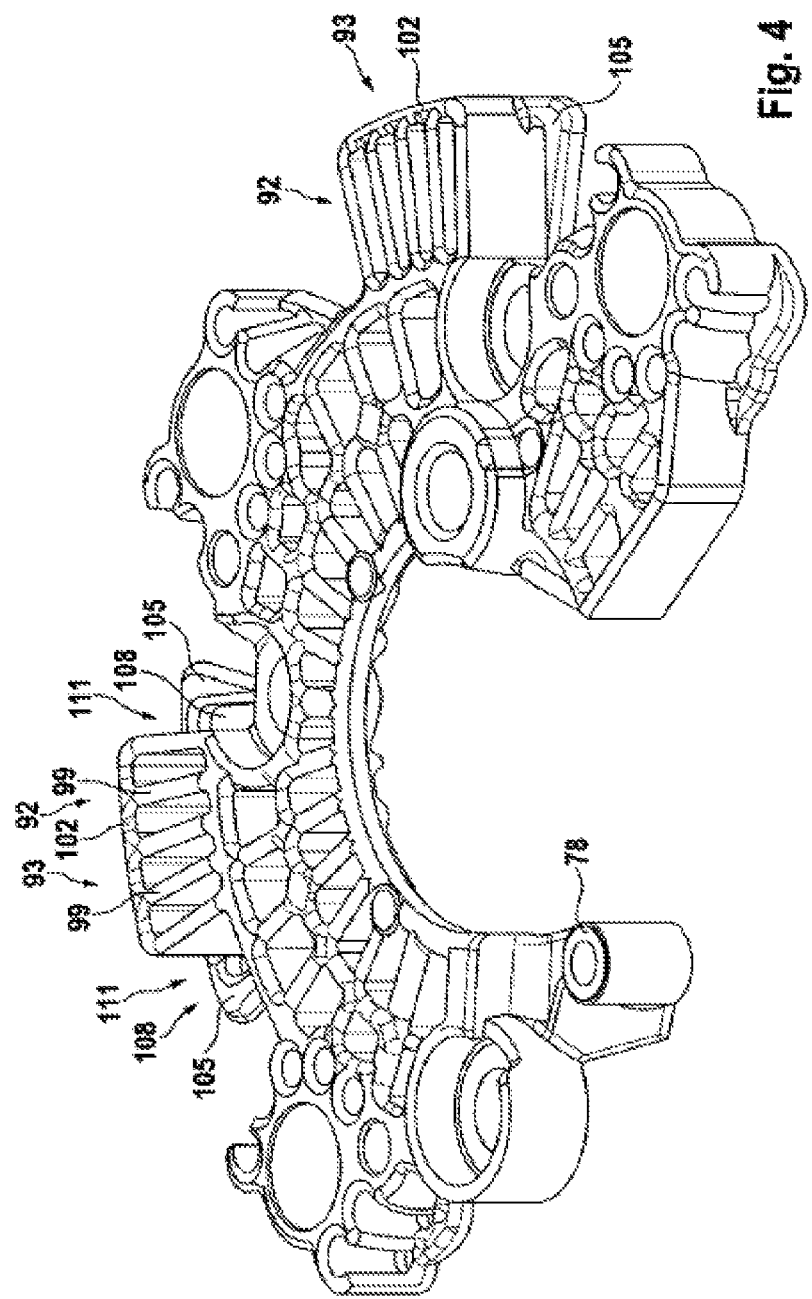

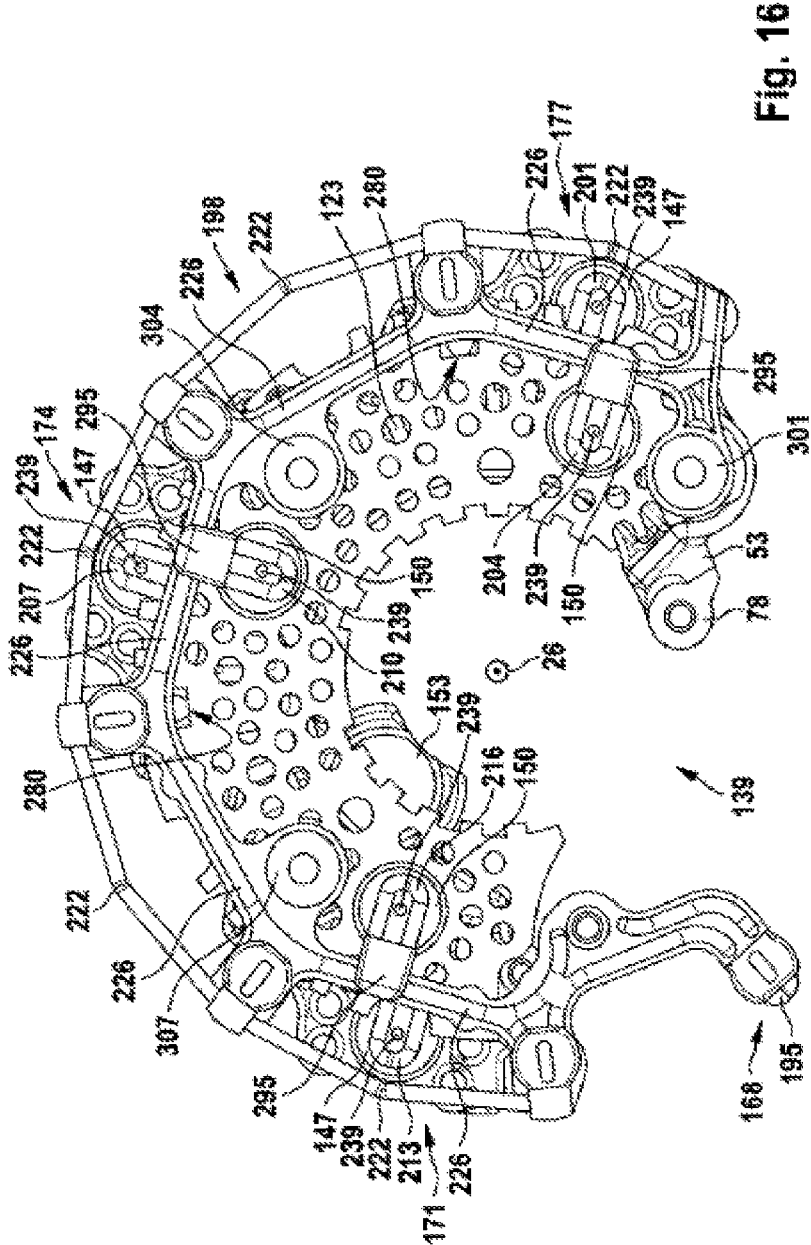

ELECTRICAL MACHINE

BACKGROUND OF THE INVENTION

EP 960464 B1 has disclosed an electrical machine in the form of an AC generator.

SUMMARY OF THE INVENTION

The proposed solution is aimed at a design of the electrical machine which is as compact as possible. By virtue of the fact that the platform extends into a recess and a connecting wire of the interconnection unit, said connecting wire emerging out of the platform, extends in the opening, it is possible for the rectifier device to move closer to the end frame, to reduce the length of the electrical machine and therefore to save a considerable amount of space. In addition, by virtue of this position of the recess and the platform with respect to one another, interface effects (flow) are reduced to the lowest possible level and, as a result, a flow cross section which is undisrupted by interfaces is as great as possible and the cooling is thus optimized. The possibility of saving space applies in particular when the connecting wire, preferably with an integrally formed loop or U-shaped terminal which is used for making contact with diode head wires, also extends, preferably exclusively, in a plane formed from the opening, i.e. in a plane which is largely determined by edges of the opening. The contact point between the connecting wire and the diode head wire should in this case also be in this plane. In order nevertheless to maintain an opening with as large an area as possible and to maintain stability of the border of said opening (fatigue failure), provision is made for a form of the platforms and a form of the recesses to be matched to one another. If the platforms fill the recesses completely or almost completely, the opening with the recess has the best possible configuration under the given circumstances, with the result that the cooling effect is the best possible. In order to improve the stability of the end frame whilst taking into consideration the cooling flow, provision is made for at least one opening to adjoin a planar end-face region, which is lower than other regions in the direction of the axis of rotation.

BRIEF DESCRIPTION OF THE DRAWINGS

In the drawing:

FIG. 3 shows a view from below of the heat sink shown in FIG. 2, FIG. 4 shows a three-dimensional view of the heat sink shown in FIG. 2,

FIG. 5a and

FIG. 14a and

FIG. 14b show a three-dimensional view of a further heat sink of the cooling device of a rectifier device in accordance with a second exemplary embodiment and a detail side view, FIG. 16 shows a view from below of the cooling device shown in FIG. 15,

FIG. 17a and

DETAILED DESCRIPTION

Figure 1:
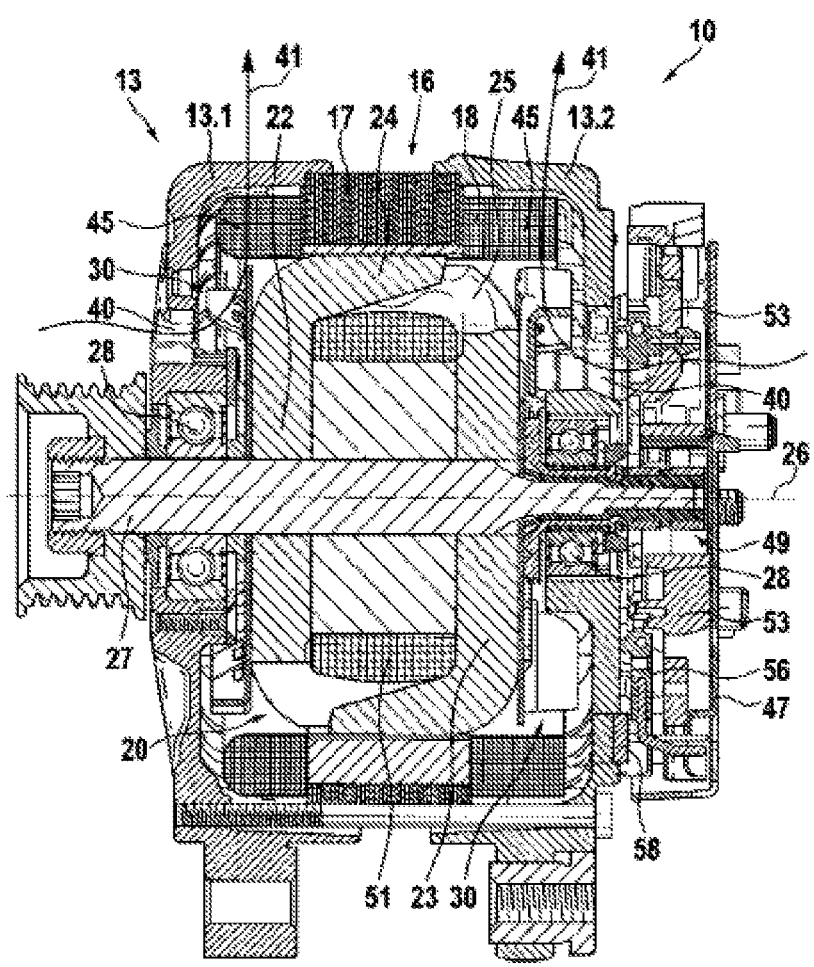
FIG. 1 shows a longitudinal section through an electrical machine.

FIG. 1 shows a cross section through an electrical machine 10, in this case in the form of a generator or an AC generator, in particular, an alternator for motor vehicles. This electrical machine 10 has, inter alia, a two-part housing 13, which comprises a first end frame 13.1 and a second end frame 13.2. The end frame 13.1 and the end frame 13.2 accommodate a so-called stator 16, which firstly comprises a stator core 17 substantially in the form of a circular ring and has a stator winding 18 inserted into the slots of said stator, said slots being directed radially inwards and extending axially. This annular stator 16 surrounds, with its slotted surface which points radially inwards, a rotor 20 in the form of a claw-pole rotor. The rotor 20 comprises, inter alia, two claw-pole plates 22 and 23, with in each case claw-pole fingers 24 and 25 extending in the axial direction being arranged on the outer circumference of said claw-pole plates. In this case, the axial direction is determined by an axis of rotation 26 of the rotor 20. Both claw-pole plates 22 and 23 are arranged in the rotor 20 in such a way that the claw-pole fingers 24 and 25 thereof, extending in the axial direction, alternate with one another over the circumference of the rotor 20. This results in magnetically required interspaces between the oppositely magnetized claw-pole fingers 24 and 25, which are referred to as claw-pole interspaces. The rotor 20 is mounted rotatably in the respective end frames 13.1 and 13.2 by means of a shaft 27 and in each case one roller bearing 28 located on each rotor side.

The rotor 20 has in total two axial end faces, on which in each case one fan 30 is fastened. This fan 30 substantially comprises a plate-shaped or disk-shaped section, from which fan blades emanate in a known manner. These fans 30 serve the purpose of providing the possibility of air exchange between the outside of the electrical machine 10 and the interior of the electrical machine 10 via openings 40 in the end frames 13.1 and 13.2. For this purpose, the openings 40 are provided substantially at the axial ends of the end frames 13.1 and 13.2, via which cooling air 41 is sucked in by means of the fans 30 as coolant into the interior of the electrical machine 10. This cooling air is accelerated radially outward by the rotation of the fans 30, with the result that it can pass through the winding overhang 45 through which cooling air can pass. Owing to this effect, the winding overhang 45 is cooled. Once it has passed through the winding overhang 45 or once it has flowed over this winding overhang 45, the cooling air takes a path radially outwards, through openings not illustrated here in this FIG. 1.

On the right-hand side in FIG. 1 there is a protective cap 47, which protects various components from environmental influences. For example, this protective cap 47 covers a so-called slipring assembly 49, which serves the purpose of supplying field current to a field winding 51. Arranged around this slipring assembly 49 is a first heat sink 53, which in this case acts as a positive heat sink. A further heat sink, which is not shown in this variously schematic figure, acts as a so-called negative heat sink. A connecting plate 56 is arranged between the end frame 13.2 and the heat sink 53 and serves the purpose of connecting the negative diodes 58 arranged in the negative heat sink and the positive diodes (not shown in this illustration here) in the heat sink 53 to one another and therefore representing a bridge circuit known per se.

Figure 2:
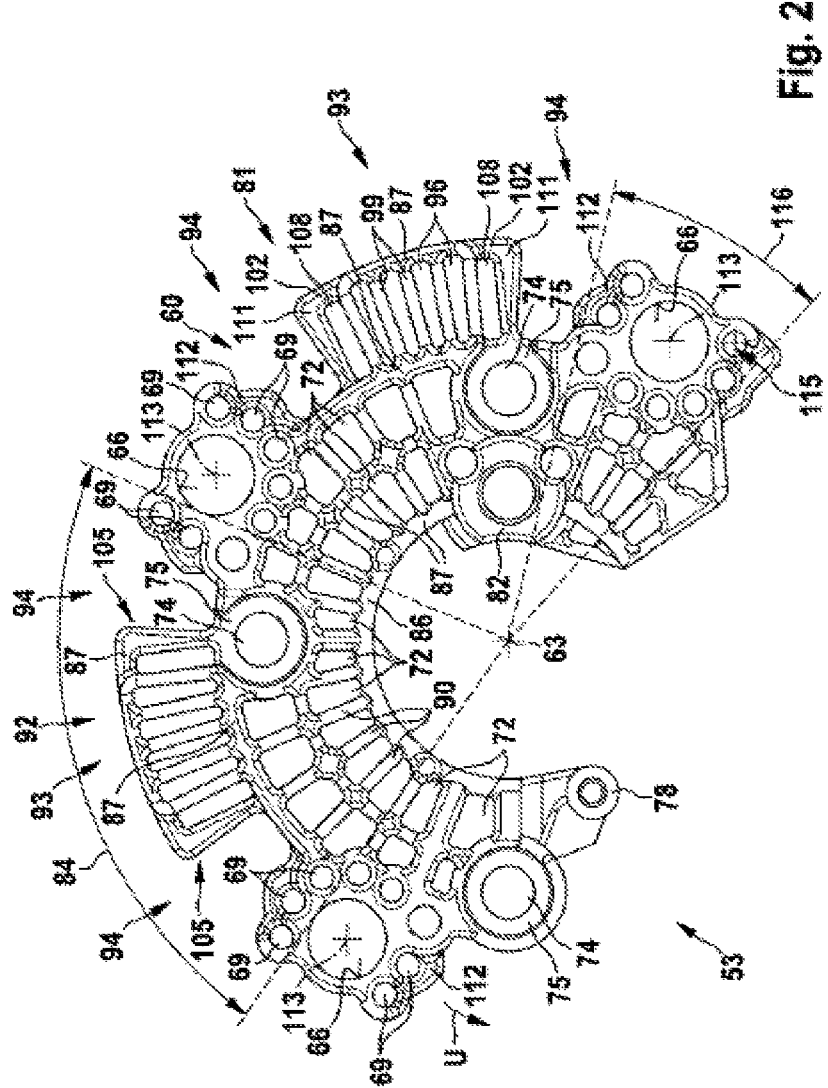
FIG. 2 shows a plan view of a heat sink of a cooling device of a rectifier device in accordance with a first exemplary embodiment.

FIG. 2 depicts a first heat sink 53. This heat sink 53 has an arcuate heat sink region 60. This arcuate heat sink region 60 has a central mid-point 63. In the state in which it is fitted to the housing 13.2, this central mid-point is congruent with the axis of rotation 26. The heat sink 53 has three receptacles 66, which are each used for accommodating a current rectifier. The current rectifier is in this case a positive diode, for example. The receptacles 66 in this case have the form of a hole, into which so-called press-in diodes (positive diodes) are later pressed, for example. Alternatively, a depression can also be provided in the surface of the first heat sink 53, for example, in order to fix a diode in the depression by means of soldering. It is also possible for a diode to be soldered to an intended location in the plane, instead of in a depression. Furthermore, the heat sink 53 has several openings, which serve to allow coolant to flow through the heat sink 53 which is hot during operation. First openings 69 are arranged next to one another in an arcuate row around a receptacle 66. These first openings 69 are arranged on both sides of a receptacle 66, i.e. on the right and left when viewed from the mid-point 63, for example, in the circumferential direction U. At least one elongate second opening 72 is arranged between the receptacles 66 and the central mid-point 63 in the direction towards the central mid-point 63, the second opening 72 with its elongate form being aligned at least substantially with the central mid-point 63. As further detail, it can also be stated that a plurality of elongate second openings 72 are arranged between the receptacles 66 with the first openings 69 and the central mid-point 63 in the direction towards the central mid-point 63, with the second openings 72 with their elongate form being aligned at least substantially with the central mid-point 63. Elongate means that the openings 72 have a longer extent in the radial direction than in the circumferential direction.

Furthermore, three cylindrical countersink regions 75, each provided with a hole 74, are provided in the heat sink region 60. There, the material thickness of the heat sink 53 is reduced to approximately 40% of that which is provided in the receptacles 66. These countersink regions are used during fitting for fixing the rectifier device to the outer side of the end frame 13.2. A threaded sleeve 78 serves to fix and to produce contact with a further component of the rectifier device. An insertion dome 82 is used for subsequently receiving and fixing a so-called B+ bolt (B-plus bolt), to which a charging cable is fixed in order to be able to supply electrical current to a vehicle battery.

As has already been mentioned, preferably a plurality of receptacles 66 is provided which are arranged spaced apart from one another on the circumference 81, i.e. preferably on or in the region of the outer circumference, of the heat sink 53. On the outer circumference primarily means in the radially outer half FIG. 2 shows that a preferably integrally formed overhang 92 of the heat sink 53 is arranged in a segment 84 between two receptacles 66, said overhang in this case in the example being designed to have a plurality of elongate second openings 72, which extend between two crosspieces 87 with an arcuate extent. The overhang 92 is separated or spaced apart from the receptacles 66 and the first openings 69 therein, on both sides in the circumferential direction U, by large bay-shaped cutouts 94. A radially inner end of the bay-shaped cutouts 94 is less far removed from the central mid-point 63 than a center 113 of a receptacle 66. The second openings 72 between two arcuate crosspieces 87 are separated by webs 90. The webs 90 preferably extend radially. The two crosspieces 87 run at least approximately in the form of a circular arc.

In the segment 84 between two receptacles 66, a conductor-like cooling segment 93, as an exemplary embodiment of an overhang 92, which is integrally connected to one crosspiece 87, extends from the outer of the two just-mentioned crosspieces 87 radially outwards. This conductor-like cooling segment 93 likewise has elongate cooling air openings 96, which are separated from one another by webs 99. These cooling air openings 96 are delimited radially outwards by a crosspiece 102. In the circumferential direction U, the cooling segment 93 has at least one opening 108 towards the lateral edge 105 of said cooling segment, the border 111 of said opening partially having a smaller material thickness than other openings 96 in the conductor-like cooling segment 93. In particular, provision is made for that lateral part of the border 111 which delimits a cutout 94 and possibly the radially outer of the lateral openings 108 to have a smaller material thickness.

A cooling segment 93, which is configured analogously to the just-described cooling segment 93, is likewise provided between the receptacles 66 approximately at the one o'clock and the four o'clock positions (FIG. 2).

The openings 69 are arranged around the receptacles 66. In order to improve access to connecting contacts, subsequently shown, which are positioned in the rectifier device next to the openings 69, provision is made for borders 112 of the openings 69 to have a smaller material thickness in the axial direction (axis of rotation 26) or in the direction of a profile axis 115 than is the case between the receptacles 66 and the openings 69 on the side of the opening 69 which are remote from a center 113 of a receptacle 66. For the same reason, the lateral openings 108 have a smaller material thickness. The profile axis 115 extends along the profile or passage profile of an opening 69.

Further elongate openings 72 adjoin the two outer crosspieces 87 radially inwards in another row and radially inwards, delimited by a further crosspiece 86 radially inwards.

The receptacle 66, the first openings 69 and the at least one elongate second opening 72 are located in a sector 116 starting from the central mid-point 63, the sector 116 having an angular width of between 25° and 40° (all exemplary embodiments).

FIG. 3 shows the rear side of the heat sink 53, which is not shown in FIG. 2. Regions of both sides are substantially parallel to one another. Subsequently, a B+ bolt with its round head is plugged through into a depression 114 in such a way that the round head finds its position in the depression 114 and a screw thread is visible from the side shown in FIG. 2.

FIG. 4 shows a heat sink 53 in a three-dimensional view from the side illustrated in FIG. 2. Here, the overhangs 92 or conductor-like cooling segments 93 are shown clearly. This applies particularly to the openings 108 and the lateral edge 105 thereof, the border 111 of said edge partially having a smaller material thickness than other openings 96 in the overhang 92 or the conductor-like cooling segment 93.

Figure 5A:
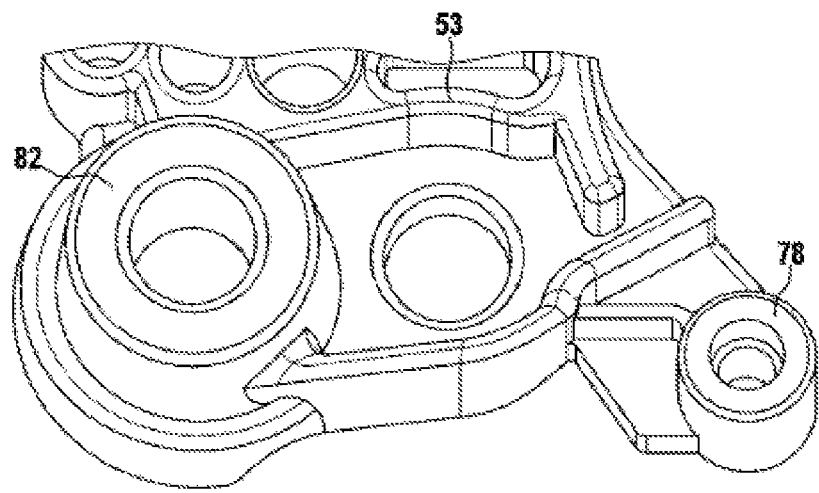
Figure 5B:
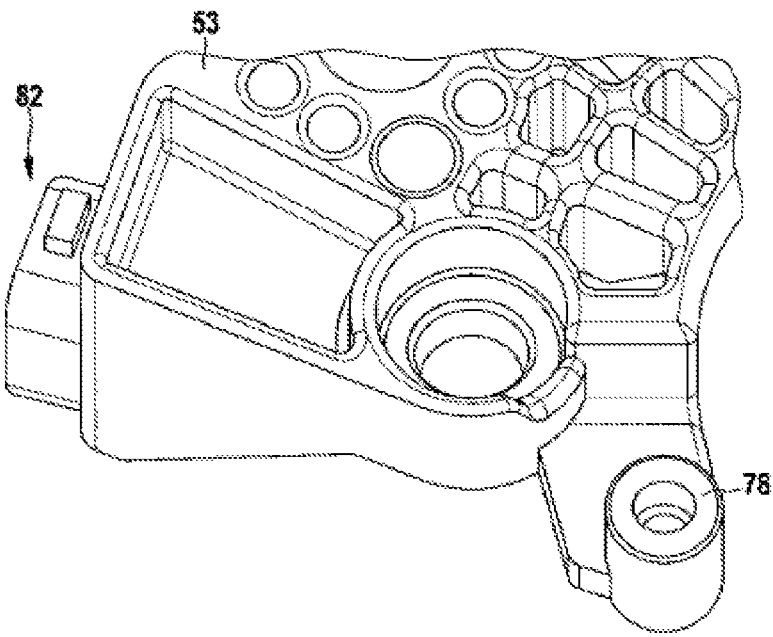
FIG. 5b each show a detail view of a variant of the heat sink shown in FIG. 2.

FIGS. 5*a* and 5*b* show various details and therefore also alternatives to fastening with a B+ bolt. In FIG. 5*a*, an alternative or additional insertion dome 82 is provided in comparison with the illustration in FIG. 2 next to the countersink region 75 located at the "9 o-clock" position, with it being possible for an additional or alternative B+ bolt to be inserted into said insertion dome. In FIG. 5*b*, an insertion dome 82 is provided in bent-back form. A B+ bolt can be inserted into the insertion dome 82 from the right on the lower side of the heat sink 53.

Figure 6:
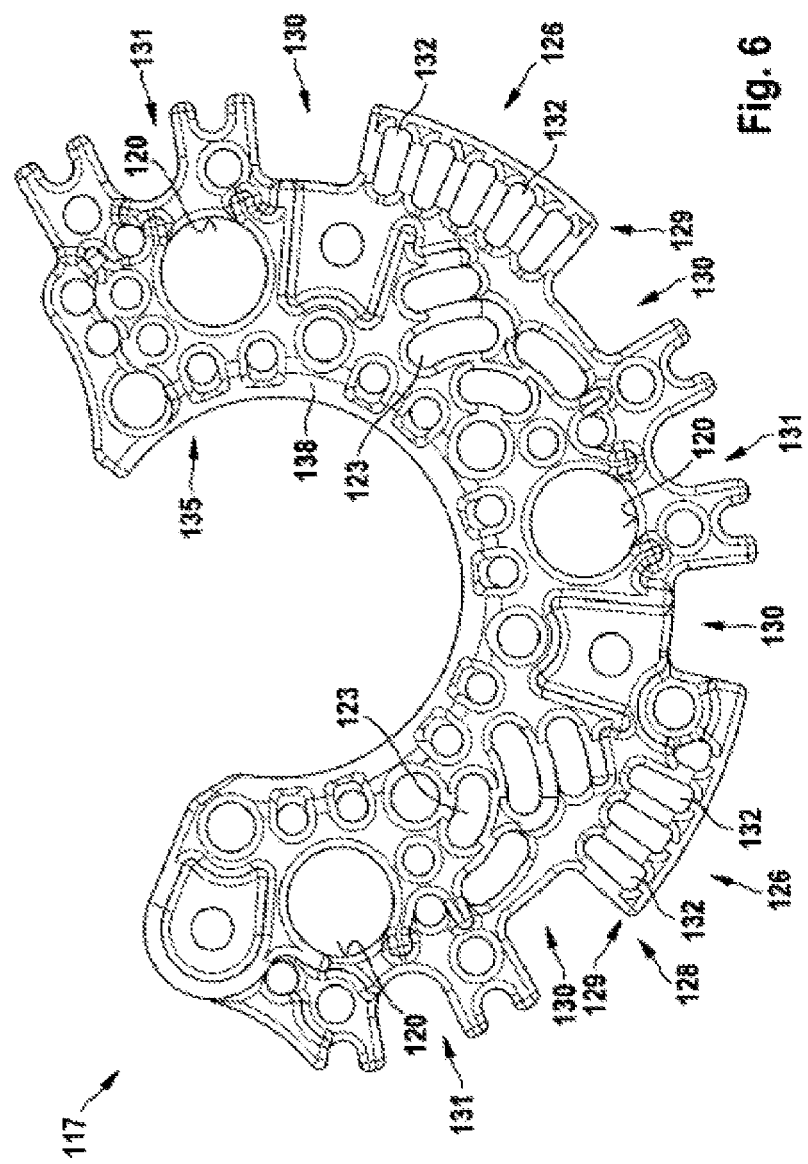
FIG. 6 shows a view of a further heat sink of the cooling device of the rectifier device.

FIG. 6 depicts a further heat sink 117. The heat sink 117 has three receptacles 120, which serve the purpose of receiving in each case one current rectifier. The current rectifier is in this case a negative diode, for example. The receptacles 120 in this case have the form of a hole, into which so-called press-in diodes (negative diodes) are later pressed, for example. Alternatively, a depression can also be provided in the surface of the further heat sink 117. Furthermore, the heat sink 120 has several openings 123, which serve to allow coolant to flow through the heat sink 120, which is hot during operation.

Figure 7:
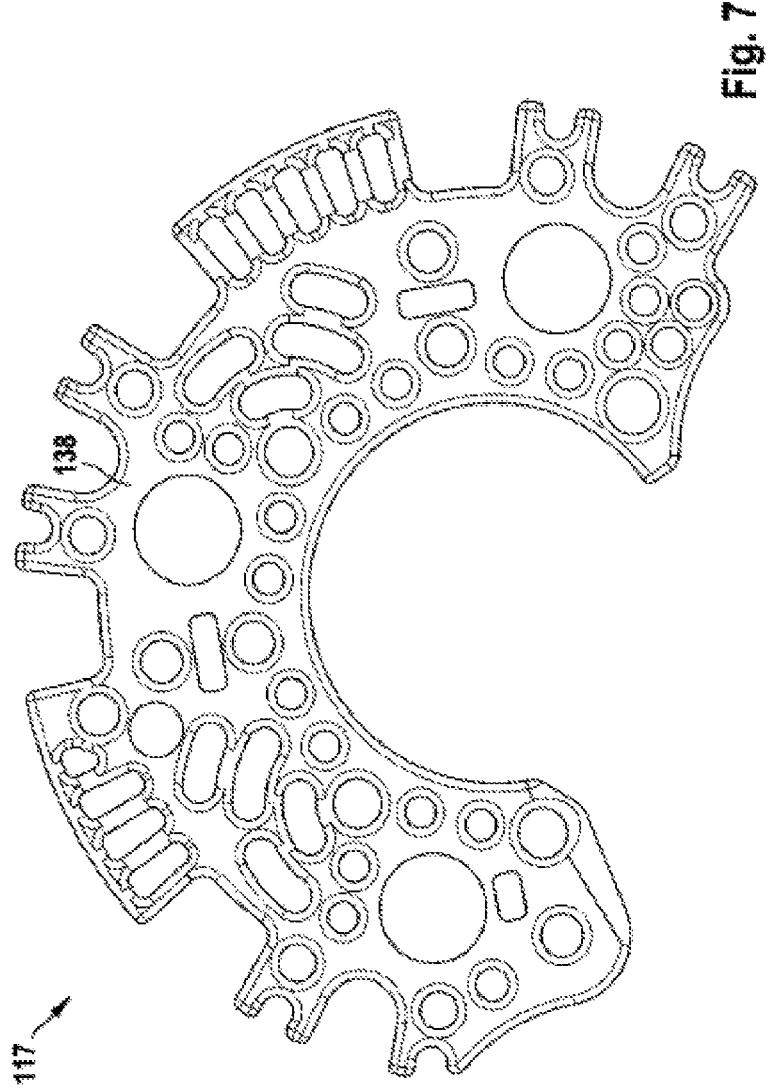
FIG. 7 shows a further view of the heat sink shown in FIG. 6.

In this case, too, a preferably integrally formed overhang 127 in the form of a conductor-like cooling segment 129 is located at at least one circumferential point 126. This conductor-like cooling segment 129 has openings 132, which extend longitudinally and radially outwards. The cooling segment 129 extends over a defined circumferential region in each case between two receptacles 120. The heat sink 117 is beveled on the inner circumference 135 (bevel 138). As can be seen in FIG. 7, that surface 138 which later points towards the first heat sink 53 is substantially planar. An outer contour 128 of the further heat sink 117 has in each case one bay-shaped cutout 130 on both sides of the overhang 127, for example directly adjacent to said overhang. In turn, these bay-shaped cutouts 130, when viewed in the circumferential direction, are each located between the overhang 127 and a respective further cutout 131. In the direction of the provided axis of rotation 26, it can furthermore be seen that the overhang 127, the cutout 130 and the cutout 131 are each located on an identical radius with respect to the axis of rotation 26.

In the assembly of the cooling device, provision is made for the two heat sinks 53 and 117 to be layered one on top of the other at a distance from one another in such a way that a flow can pass through and between them, and the conductor-like cooling segment 129 of the further heat sink 117 is arranged above the conductor-like cooling segment 93 of the first heat sink 53. Accordingly, the invention discloses a cooling device 141, said cooling device having a heat sink 117, which has further holes 123 and is substantially in the form of a ring segment, a conductor-like cooling segment 129 being located at at least one circumferential point 126, the two heat sinks 53, 117 being layered one on top of the other at a distance from one another in such a way that a flow can pass through and between them, and the conductor-like cooling segment 129 of the further heat sink 117 is arranged above the conductor-like cooling segment 93 of the first heat sink 53.

Figure 8:
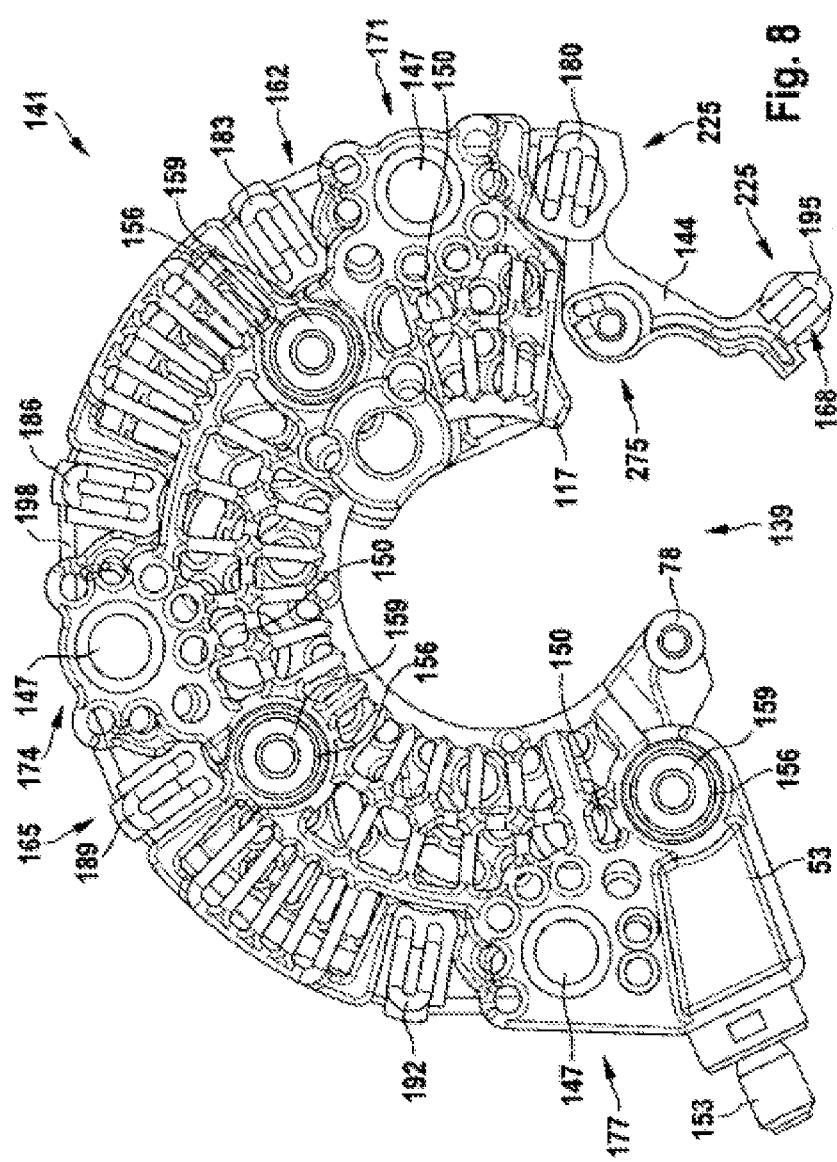
FIG. 8 shows a plan view of the cooling device and the rectifier device.

FIG. 8 shows the cooling device 141 which is assembled to form the rectifier device 139 and comprises a first heat sink 53 (positive heat sink), a second heat sink 117 (negative heat sink), the interconnection unit 144, positive current rectifiers 147 (positive diodes), negative current rectifiers 150 (negative diodes), B+ bolts 153, insulating sleeves 156 and rivets 159 (tubular rivets). Furthermore, spacers are used (not shown here). The view of the cooling device 141 corresponds to the view from the right in direction of the axis of rotation 26 in respect of FIG. 1 with the protective cap 47 removed.

The interconnection unit 144 has, in a known manner, a plurality of conductor sections 162, 165 and 168 which serve the purpose of interconnecting in each case one pair 171, 174 and 177 of in each case one positive current rectifier 147 (positive diode) and in each case one negative current rectifier 150 such that the stator windings which are connected to the connecting contacts 180, 183, 186, 189, 192 and 195 (via the circumferential arc 198) and the AC voltage produced thereby is rectified. The connecting contacts 180 and 183 are connected to the pair 171, the connecting contacts 186 and 189 are connected to the pair 174 and the connecting contacts 192 and 195 are connected to the pair 177 (via the circumferential arc 198).

Figure 9:
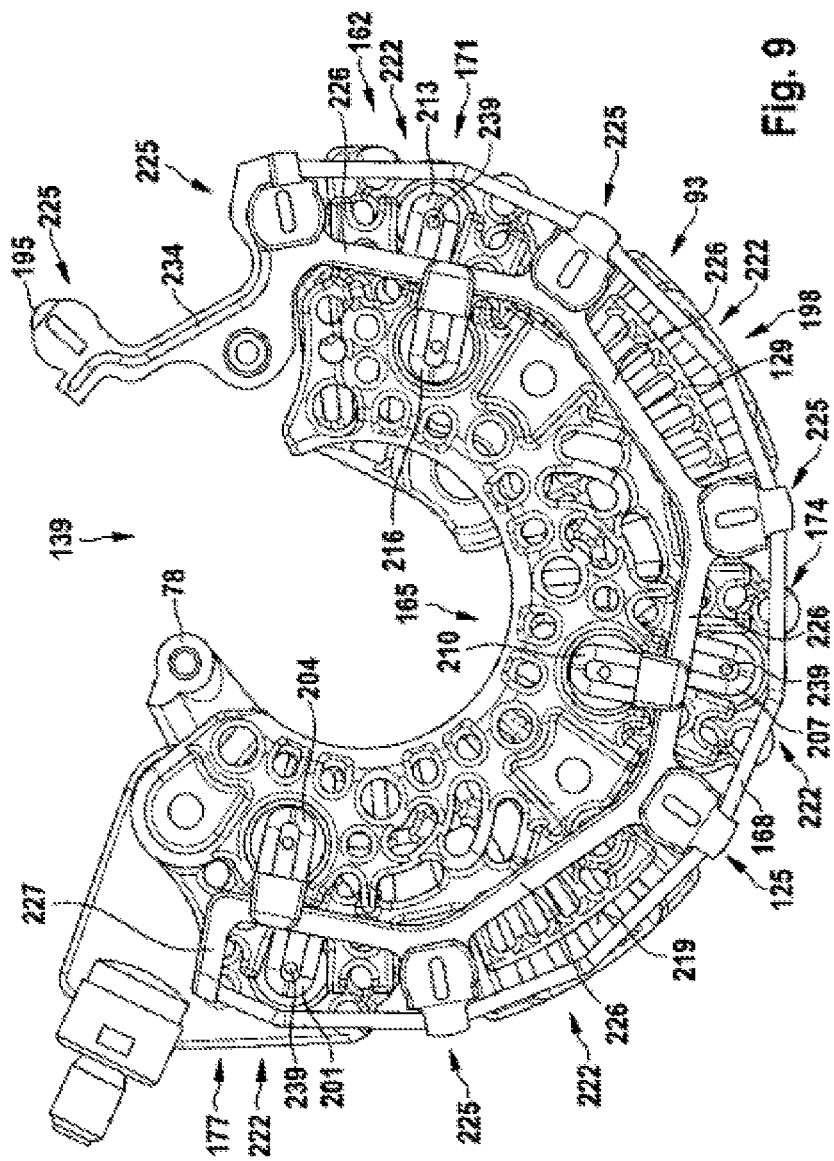
FIG. 9 shows a view from below of the cooling device and the rectifier device shown in FIG. 8.

FIG. 9 shows the assembled cooling device 141 from the other side, namely the side not shown in FIG. 8. From this side, connecting contacts 201 and 204, connecting contacts 207 and 210 and connecting contacts 213 and 216 are shown, which each interconnect a pair 171, 174 and 177 of in each case one positive current rectifier 147 (positive diode) and in each case one negative current rectifier 150. This interconnection corresponds to a conventional bridge rectifier circuit. The positive current rectifiers 147 (positive diodes), press-in diodes and the negative current rectifiers 150 (negative diodes), are electrically conductively connected to the first heat sink 53, with the result that during operation (in the switched-on state, field current, rotating rotor 20), a positive voltage is applied to the B+ bolt 153 via the current rectifier 150.

The heat sink 117 having holes 123 is substantially in the form of a ring segment, wherein an overhang 127 or conductor-like cooling segment 129 is located at at least one circumferential point 126, the two heat sinks 53 and 117 being layered one on top of the other at a distance from one another in such a way that a flow can pass through and between them, and the conductor-like cooling segment 129 of the further heat sink 117 is arranged above the conductor-like cooling segment 93 of the first heat sink 53. A greatest outer diameter of the overhang 127 or cooling segment 129 is smaller than an outer diameter of the overhang 92 of the cooling segment 93. The circumferential arc 198 is located, with respect to the axis of rotation 26, at the same axial position as an outer edge 219 and, with respect to FIG. 9, over the overhang 92. As can be seen from FIG. 9, the circumferential arc 198 of the conductor section 168 has a plurality of bends 222. Some of these bends 222 are at an identical circumferential position to that of the connecting contacts 201, 207 and 213. The bends 222 result in a distance (not denoted any further here) between a bend 222 and a connecting contact 201, 207 and 213 being greater than when a simple circular arc is provided at the position of the bend 222. A bend angle determined at the bend 222 is thus arranged such that the bend angle is located on the radial inner side of the circumferential arc. The outer angle complementary to the bend angle is greater than the bend angle. The circumferential arc 198 extends, with respect to the mid-point (axis of rotation 26), over an angular dimension that is greater than the angle over which the current rectifiers 147 and 150 together extend in the heat sink 53 and 117. In other words, the circumferential arc 198 extends over approximately 225° of the circumference, with respect to the mid-point (axis of rotation 26). The circumferential arc 198 is supported on the guide connecting piece 225 by means of integrally formed eyelets 223. In a side view, the rectifier device 139 can be described as follows:

an overhang 92 has initially one cutout 94 on the right and the left in the circumferential direction U, with a guide connecting piece 225 resting in said cutout. Initially a cutout 130, in which a guide connecting piece 225 rests, is located next to an overhang 127 on the right and left in the circumferential direction U. Starting from the overhang 127, a further cutout 131, into which connecting contacts 239 (diode head wires) protrude, is located on the other side of the cutout 130.

The interconnection unit 144 has guide connecting pieces 225 at in total six positions, in the example shown in FIGS. 8 and 9. These guide connecting pieces 225 have the task of receiving, with their funnel-shaped ends directed towards the viewer in FIG. 9, some conductor ends of the stator winding 18 and of guiding said conductor ends in a targeted manner to (U-shaped or loop-shaped) connecting contacts 180, 183, 186, 189, 192 and 195, which emerge out of the guide connecting pieces and extend at an angle over said guide connecting pieces, in order that it is easily possible for contact to be made between the conductor ends and the connecting contacts 180, 183, 186, 189, 192 and 195, preferably by machine. Four of the tubular guide connecting pieces 225 and in each case one connecting contact 183, 186, 189 and 192 of the interconnection unit 144 are located between a conductor-like cooling segment 93 and a receptacle 66. The two other guide connecting pieces 225, at the "4 o'clock" and approximately "5 o'clock" positions in FIG. 8, are outside the outer contour of the first heat sink 53. The guide connecting piece 225 which is located between the end frame 13.2 and the controller 231 in the direction of the axis of rotation 26, is arranged outside the outer contour of the first heat sink 53, when viewed in the direction of the axis of rotation 26.

Figure 10:
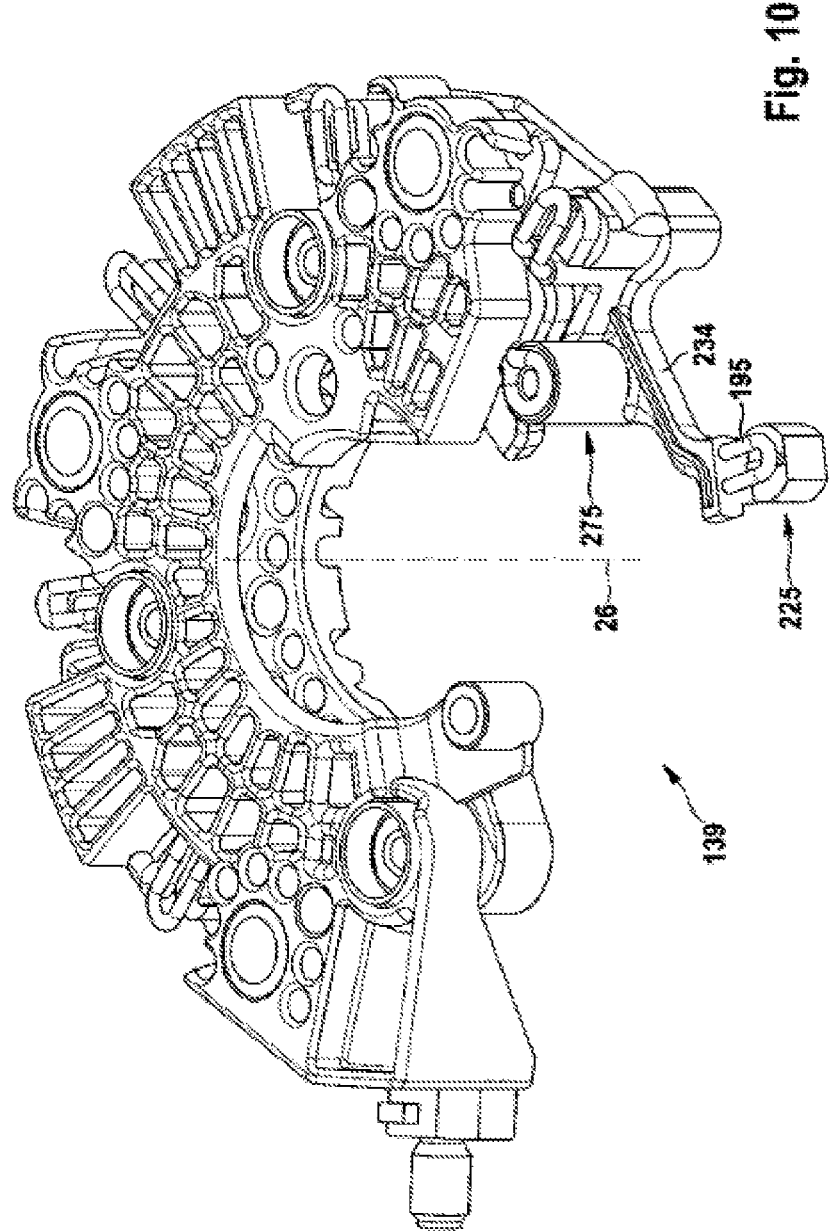
FIG. 10 shows a three-dimensional view of the object shown in FIG. 8.

While the guide connecting piece 225 at the "4 o'clock" position is configured in terms of its size and configuration substantially like the other four guide connecting pieces 225, the guide connecting piece 225 at the "5 o'clock" position is different. Said guide connecting piece 225, which is referred to below as the "small" guide connecting piece 225, does also have a connecting contact 195. However, the guide connecting piece 225 itself is a small guide connecting piece 225 and is therefore shorter than the other guide connecting pieces 225 with respect to the axis of rotation 26 (see also FIG. 10). The guide connecting pieces 225 are integrally connected to one another by webs 226. The conductor section 162 is located in the web 226 between the guide connecting piece 225 at the "2 o'clock" position (FIG. 9) and the guide connecting piece 225 at the "4 o'clock" position. There is no conductor section embedded in the web 226 between the "4 o'clock" position and the "6 o'clock" position, but in turn, there is one located in the web 226 between the "6 o'clock" position and the "7 o'clock" position. A further conductor section 162 is embedded between the guide connecting piece 225 at the "9 o'clock" position and that end 227 of the interconnection unit 144 which then merges with the circumferential arc 198 of the conductor section 168 and leads to the small guide connecting piece 225. The conductor sections, with the exception of the circumferential arc 198, are each embedded in the polymer material of the interconnection unit 144.

The interconnection unit 144 is to a large extent located in a region around which there is little or no flow of cooling air (flow dead-area). This region is in the radially outer region (axis of rotation 26) below the first heat sink 53 (positive heat sink). In any case, this applies to the webs 226 and the circumferential arc 198, which are both arranged, in respect of the radial extent of the first heat sink 53 (positive heat sink) beneath an outer half of the radial extent thereof "Beneath" an outer half means that the webs 226 and the circumferential arc 198 are located between the end frame and the heat sink 53 (positive heat sink). Furthermore, the circumferential arc 198 and a radially outer edge of the receptacles 66 are preferably congruent (see also FIG. 9).

Figure 11:
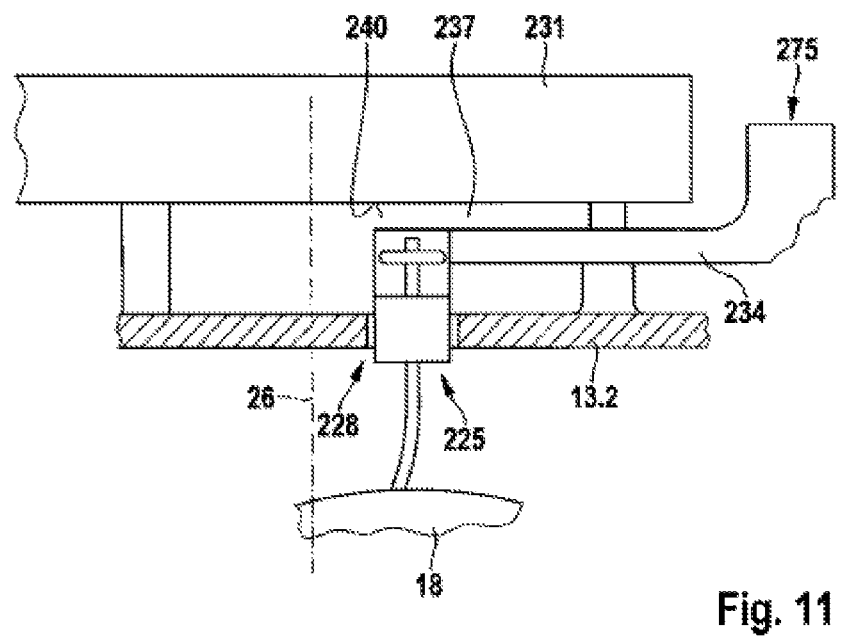
FIG. 11 shows a detail side view of the fitted rectifier device.
Figure 20:
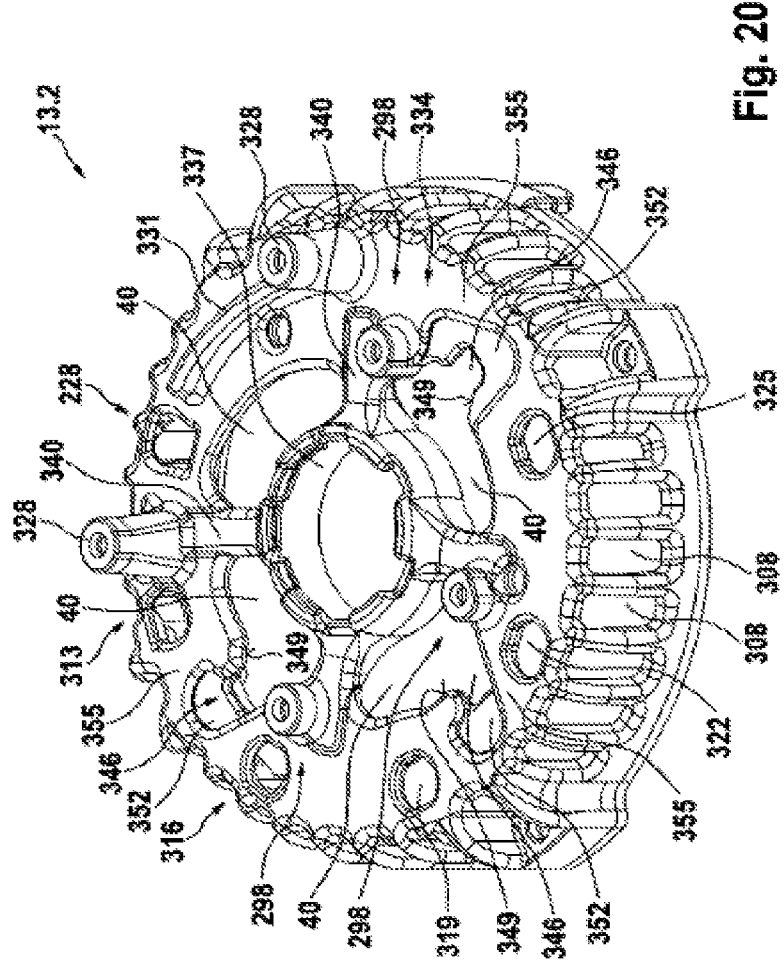
FIG. 20 shows a three-dimensional view of an end frame.
Figure 21:
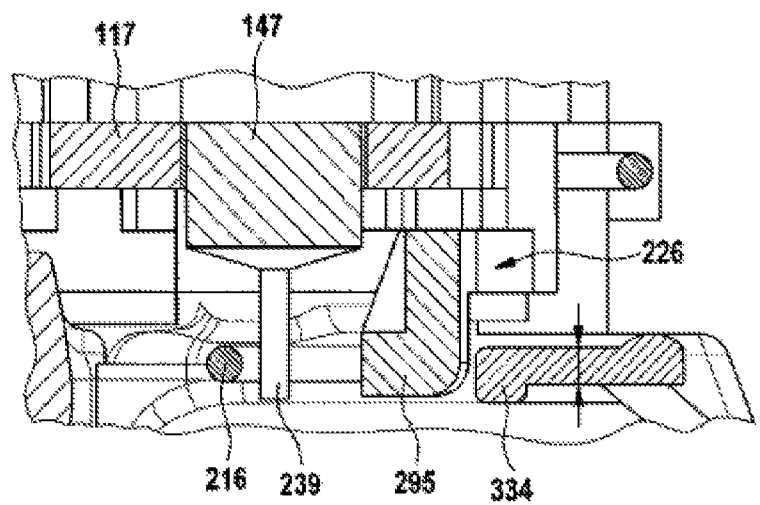
FIG. 21 shows a sectional illustration through a platform in accordance with the two exemplary embodiments.

The purpose of this arrangement is shown in FIG. 11: as is the case for all of the other guide connecting pieces 225, the small guide connecting piece 225 is also arranged or plugged into an opening 228 in the end frame 13.2. Conductor ends 228 of the stator winding 18 are plugged in through the small guide connecting piece 225 and are electrically conductively connected at their upper end to the connecting contact 195. A welded joint or else a soldered joint is preferably provided at this point. It is likewise also possible in an alternative configuration for a screw connection to be provided here. By virtue of this small guide connecting piece 225 being designed to be so short, it is possible for said small guide connecting piece to be arranged between the stator winding 18 and a controller 231 in a space-saving manner in the axial direction (axis of rotation 26). The controller 231 serves the purpose of generating a field current and, by means of brushes (not illustrated here), supplying field current to the field winding 51 via the abovementioned slipring assembly 49 and thereby electromagnetically exciting the rotor 20. An arm 234, in which the conductor section 168 is embedded and which physically connects the two guide connecting pieces 225 to one another, said guide connecting pieces being located outside the outer contour of the first heat sink 53, likewise reaches beneath the controller 231 and therefore into an interspace 237, which is located between a lower side 240 of the controller 231, said lower side being directed in the axial direction (axis of direction 26) towards the end frame 13.2, and the end frame 13.2 itself. The arm 234, which integrally connects the short guide connecting piece 225 to the other guide connecting pieces 225, in the process engages around a fixing connecting piece 238 radially from the inside (FIG. 20).

The invention therefore discloses an electrical machine 10, in particular an AC generator, with a rotor 20, which has an axis of rotation 26, with a stator 16 comprising a stator core 17 and a stator winding 18 inserted therein which has conductor ends 228, which are interconnected by a rectifier device 139, with a controller 231 for controlling a field current and a cooling device in the rectifier device 139, with a first heat sink 53, which has at least one receptacle 66 at which a current rectifier 147 is received, with a second heat sink 117, the heat sink 117 having at least one receptacle 120 at which a current rectifier 150 is received, with an interconnection unit 144, which interconnects the current rectifiers 147, 150 to form a bridge circuit, wherein the interconnection unit 144 has a plurality of integrally formed guide connecting pieces 225, in which conductor ends 228 of the stator winding 18 are received, a guide connecting piece 225 being arranged between the end frame 13.2 and the controller 231 in the direction of the axis of rotation 26.

Figure 12:
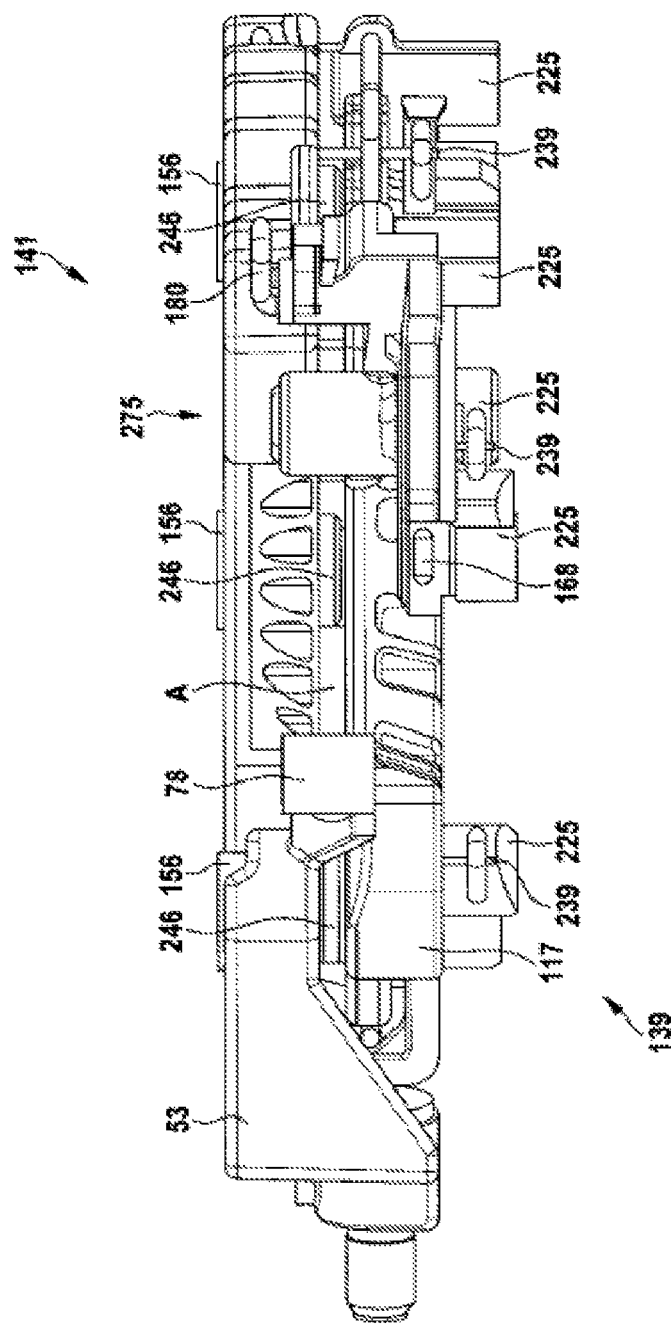
FIG. 12 shows a side view of the rectifier device.

FIG. 12 shows a side view of the cooling device 141. Spacers 246 between the first heat sink 53 and the further heat sink 117 ensure a distance A between the two heat sinks 53 and 117. The guide connecting pieces 225 are plugged into the openings 228 in the end frame 13.2, with the result that the webs 226 rest on the end frame 13.2. The heat sink 117 is arranged with part of its body between in each case two directly adjacent guide connecting pieces 225; furthermore, part of the heat sink 117 is surrounded by the webs 226. FIG.

12 shows a few connecting contacts 239 (diode head wires) of the current rectifiers 147 and 150.

Figure 13:
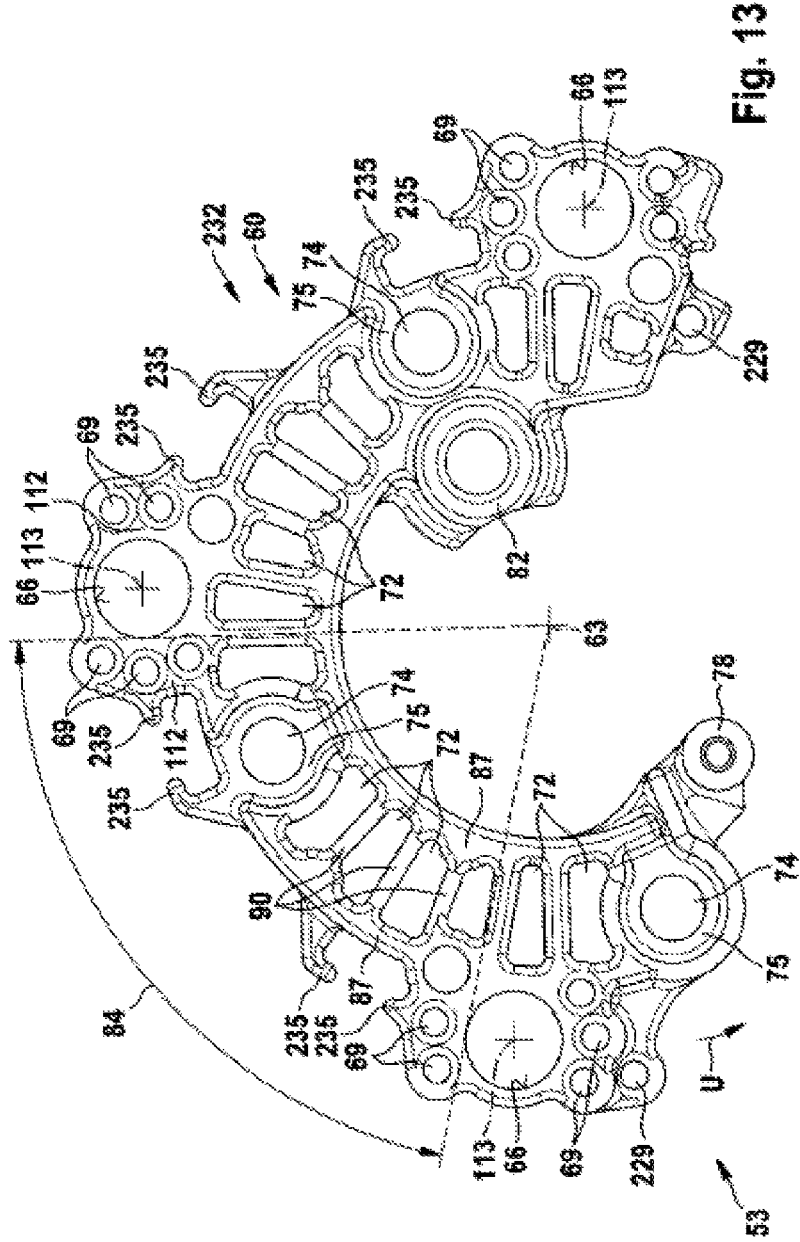
FIG. 13 shows a plan view of a heat sink of a cooling device of a rectifier device in accordance with a second exemplary embodiment.

FIG. 13 depicts a further exemplary embodiment of a first heat sink 53. This heat sink 53 has an arcuate heat sink region 60. This arcuate heat sink region 60 has a central mid-point 63. This central mid-point 63 is congruent with the axis of rotation 26 in the state in which the heat sink is fitted to the housing 13.2. The heat sink 53 has three receptacles 66, which serve the purpose of receiving in each case one current rectifier. The current rectifier is in this case a positive diode, for example. In this case, the receptacles 66 have the configuration of a hole, into which so-called press-in diodes (positive diodes) are later pressed in, for example. Instead of a hole, it is alternatively also possible, for example, for a depression to be provided in the surface of the first heat sink 53 in order to fix the diode; cf. also the description relating to the previously-mentioned exemplary embodiment. Furthermore, the heat sink 53 has several openings, which are used for allowing a flow of coolant to pass through the heat sink 53 which is hot during operation. First openings 69 arranged next to one another in an arcuate row are arranged around a receptacle 66. These first openings 69 are arranged on both sides of a receptacle 66 in the circumferential direction U. In the direction towards the central mid-point 63, at least one elongate second opening 72 is arranged between the receptacles 66 and the central mid-point 63, the second opening 72 with its elongate form being aligned at least substantially with the central mid-point 63. On closer look, it can also be seen that a plurality of elongate second openings 72 are arranged between the receptacles 66 with the first openings 69 and the central mid-point 63 in the direction towards the central mid-point 63, the second openings 72 with their elongate form being aligned at least substantially with the central mid-point 63. Two openings 229, that is to say in the second row around the respective receptacle 66, are used for fixing the heat sink 53 to the interconnection unit 144, by virtue of an optional, preferably clamping, pin (press-fit between pin and opening 229) or snap-action hook of the interconnection unit 144 engaging in the respective opening 229.

Furthermore, three cylindrical countersink regions 75 provided in each case with a hole 74 are provided in the heat sink region 60. There, the material thickness of the heat sink 53 is reduced to approximately 40% of that which is provided for the receptacles 66. These countersink regions 75 serve during fitting for fixing the rectifier device 139 to the end frame 13.2. A threaded sleeve 78 is used for fixing and making contact with a further component of the rectifier device 139 and is integrally formed on the heat sink 53, as is already the case in the first exemplary embodiment. An insertion dome 82 is used for subsequently receiving an fixing a so-called B+ bolt (B-plus bolt) on which a charging cable is fixed in order to be able to supply electrical current to a vehicle battery.

As has already been mentioned, a plurality of receptacles 66 is provided which are arranged spaced apart from one another on the circumference 81 of the heat sink 53.

It can be seen from FIG. 13 that a plurality of elongate second openings 72 are arranged in a segment 84 between two receptacles 66, said openings extending between two crosspieces 87 with an arcuate extent. The second openings 72 between the two arcuate crosspieces 87 are separated by webs 90. The webs 90 preferably extend radially. The two crosspieces 87 run at least approximately in the form of a circular arc.

The openings 69 are arranged around the receptacles 66. In order to improve access to subsequently shown connecting contacts which are positioned in the rectifier device 139 next to the openings 69, provision is made for borders 112 of the openings 69 to have a smaller material thickness in the axial direction (axis of rotation 26) on the side of the openings 69 which are remote from a center 113 of a receptacle 66 than is the case between the receptacles 66 and the openings 69.

By way of example, eight hook elements 235 are located over the outer circumference 232 of the heat sink 53. In each case two hook elements 235 arranged in pairs are positioned opposite one another such that said two hook elements, together with the outer circumference 232, form an undercut, which will be described in more detail further below.

Figure 14:
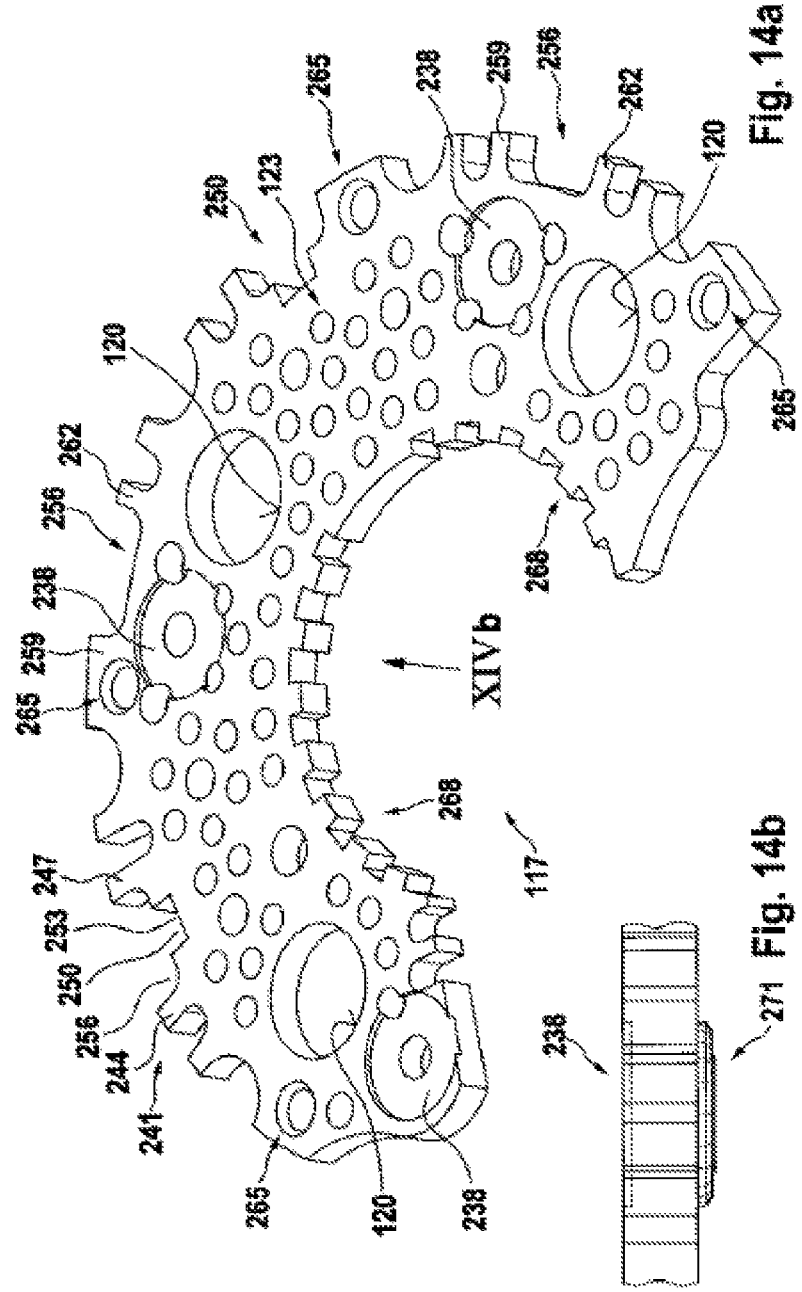

FIG. 14a shows a three-dimensional view of a further heat sink 117 of the second exemplary embodiment. The heat sink 117 has three receptacles 120, which serve the purpose of receiving in each case one current rectifier. The current rectifier is in this case a negative diode, for example. Here, the receptacles 120 have the form of a hole, into which so-called press-in diodes (negative diodes) are later pressed in, for example. Alternatively, a depression can also be provided in the surface of the further heat sink 120, for example; see also the explanations previously as regards various fixing possibilities for diodes. Furthermore, the heat sink 120 has several openings 123, which are used for allowing a flow of coolant to pass through the heat sink 120 which is hot during operation. Furthermore, three cylindrical depressions 238 are introduced in the surface of the heat sink 117 and serve the purpose of centering cylindrical spacers. Various ribs are illustrated at the outer circumference 241 of the heat sink 117. The ribs 244 and 247 are directly adjacent ribs which can also be referred to as very flat cooling ribs of the laminated heat sink 117, which is 4 mm thick, for example. A stepped recess 250 is located between these two ribs 244 and 247. This stepped recess 250 comprises a small sub-recess 253, which is closer to a center (not illustrated here) of the heat sink 117 than a larger outer recess 256, which opens radially further outwards and is also part of the recess 250. Such a stepped recess 250 is provided on the outer circumference 241 in total two times. A further special recess 256, likewise delimited by ribs 259 and 262, is likewise located on the outer circumference 241. Round holes 265 are likewise shown, by way of example, four times over the outer circumference 241 of the heat sink 117 and therefore directly above the webs of an interconnection means (not yet shown in this example), said holes being countersunk on the side on which the depressions 238 are located. Ribs 268 are arranged distributed over the inner circumference of the heat sink 117.

A view of a depression 238 can be seen in FIG. 14b, which shows a view of the ribs 268. The depression 238 is opposite a platform 271 which has a slightly larger diameter.

Figure 15:
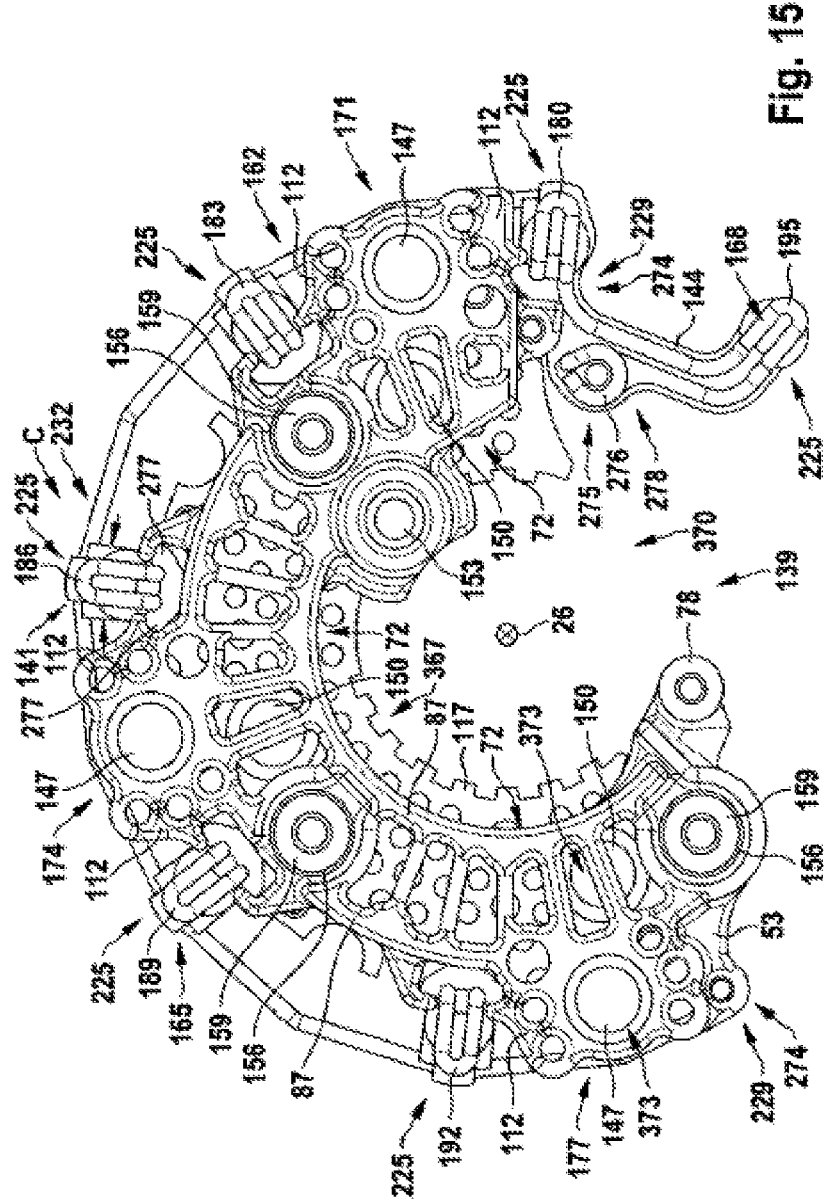
FIG. 15 shows a plan view of the cooling device and the rectifier device in accordance with the second exemplary embodiment.

FIG. 15 shows a plan view of the rectifier device 139 or assembled cooling device 141 comprising the first heat sink 53 (positive heat sink), the second heat sink 117 (negative heat sink), the interconnection unit 144, the positive current rectifiers 147 (positive diodes), the negative current rectifiers 150 (negative diodes), the B+ bolts 153, the insulating sleeves 156 and the rivets 159 (tubular rivets). Furthermore, spacers (not shown here) are used. The view of the cooling device 141 corresponds to the view from the right in direction of the axis of rotation 26 of FIG. 1 with the protective cap 47 removed.

The interconnection unit 144 has, in a known manner, a plurality of conductor sections 162, 165 and 168, which serve the purpose of interconnecting in each case one pair 171, 174 and 177 of in each case one positive current rectifier 147 (positive diode) and in each case one negative current rectifier 150 in such a way that the stator windings connected to the connecting contacts 180, 183, 186, 189, 192 and 195 (connecting arc) and the AC voltage produced thereby is rectified. The connecting contacts 180 and 183 are connected to the pair 171, the connecting contacts 186 and 189 are connected to the pair 174 and the connecting contacts 192 and 195 (via the circumferential arc 198) are connected to the pair 177.

FIG. 15 also shows that, as is already the case in the first exemplary embodiment, the elongate openings 72 are arranged axially (axis of rotation 26) above the negative current rectifiers 150 (negative diodes). The negative current rectifiers 150 (negative diodes) are in this case also, in relation to the axis of rotation 26 as the center, on a smaller radius than the positive current rectifiers 147 (positive diodes). That part of the heat sink 53 which is delimited by the inner of the two crosspieces 87 is arranged on a larger radius than that region of the heat sink 117 which is arranged at this circumferential point.

The rectifier arrangement is connected to the stator windings at the connecting contacts 180, 183, 186, 189, 192 and 195 (connecting arc). For this purpose, as shown in FIG. 11, provision is made for conductor ends 228 (stator connecting wires) to be pushed through the guide connecting pieces 225 and the loop-shaped connecting contacts 180, 183, 186, 189, 192 and 195. The actual fixing and contact-making between the connecting contacts 180, 183, 186, 189, 192 and 195 and the conductor ends 228 is performed by virtue of the connecting contacts 180, 183, 186, 189, 192 and thus the lateral wire regions (see example and contact point C) of the conductor section 165 being pressed above the guide connecting piece 225 in the direction of the arrows illustrated there and being welded to one another once contact has been made with the conductor ends 228. Alternatively, contact-making by means of soldering is also possible here, for example. In order that the lateral wire regions of the conductor section 165 can be moved towards one another at all, a correspondingly shaped (welding) tongue is required, for example. The tongue parts thereof need to be introduced between a lateral wire region of a connecting contact and the borders 112 of the openings 69 on the side of the openings 69 which are remote from a center 113 of a receptacle 66. This makes it possible for the material thickness of the border 112 to be smaller in the axial direction (axis of rotation 26) than is the case between the receptacles 66 and the openings 69. The heat sink 53 is less thick there. FIG. 15 shows the pins 274 which have already been mentioned with respect to FIG. 13, showing the way in which said pins protrude through the opening 229 and connect the heat sink 53 to the interconnection unit 144 in clamping fashion in the opening 229. A conductor in the form of a circumferential arc 198 emanates integrally from a connecting contact 195 which is directly associated with the short guide connecting piece 225, a section of said conductor being arranged beneath an outer edge of a receptacle 66, in the direction of the axis of rotation 26. The circumferential arc 198 is arranged between the end frame 13.2 and the heat sink 53.

A screw-on connecting piece 275 bears a contact loop 276, which covers beneath it a screw nut 278 which is encapsulated by injection molding and is embedded in the polymer of the screw-on connecting piece. The contact loop 276 acts as a so-called "V terminal". The screw-on connecting piece 275 has the same design in all of the exemplary embodiments.

FIG. 16 shows the assembled cooling device 141 from the other side, namely the side not shown in FIG. 15. From this side, connecting contacts 201 and 204, connecting contacts 207 and 210 and connecting contacts 213 and 216 can be seen, which each interconnect a pair 171, 174 and 177 of in each case one positive current rectifier 147 (positive diode) and in each case one negative current rectifier 150. This interconnection corresponds to a conventional bridge rectifier circuit. The positive current rectifiers 147 (positive diodes), press-in diodes and also the negative current rectifiers 150 (negative diodes) are electrically conductively connected to the first heat sink 53 with the result that, during operation (in the switched-on state, field current, rotating rotor 20) a positive voltage is present at the B+ bolt 153 via the current rectifier 150.

The heat sink 117 having holes 123 is substantially in the form of a ring segment, the two heat sinks 53 and 117 being layered one on top of the other at a distance from one another in such a way that a flow can pass through and between them. As can also be seen from FIG. 9, the circumferential arc 198 of the conductor section 168 has a plurality of bends 222. Some of these bends 222 are at an identical circumferential position to the connecting contacts 201, 207 and 213. The bends 222 result in a distance (not described in any further detail here) between a bend 222 and a connecting contact 201, 207 and 213 which is greater than if a simple circular arc were to be provided at the position of the bend 222. This improves the accessibility to the connecting contacts 201, 207 and 213, for example, which need to be connected to the connecting contacts of the current rectifiers 147 (diode head wires).

The interconnection unit 144 has guide connecting pieces 225 at in total six positions, in the example shown in FIGS. 15 and 16. These guide connecting pieces 225 have the task, as already mentioned, of receiving some conductor ends of the stator winding 18 with their funnel-shaped ends directed towards the viewer in FIG. 16 and of guiding said conductor ends in a targeted manner to the connecting contacts 180, 183, 186, 189, 192 and 195, in order that it is easily possible for contact to be made between the conductor ends and the connecting contacts 180, 183, 186, 189, 192 and 195, preferably by machine. While the guide connecting piece 225 at the "7 o'clock" position has substantially the same configuration in terms of its size and configuration as the other four guide connecting pieces 225 ("9 o'clock", "10 o'clock", "12 o'clock" and "2 o'clock" positions, position indications with reference to FIG. 16), the guide connecting piece 225 at the "6 o'clock" position is different. This guide connecting piece 225, which is referred to below as the "small" guide connecting piece 225, does also have a connecting contact 195. However, the guide connecting piece 225 itself is a small guide connecting piece 225 and is therefore shorter than the other guide connecting pieces 225 in respect of the axis of rotation 26 (see also FIG. 10). The guide connecting piece 225 between the end frame 13.2 and the controller 231 is shorter than the other guide connecting pieces 225 in the direction of the conductor ends 228 arranged in the guide connecting piece 225. The guide connecting pieces 225 are integrally connected to one another by webs 226. The conductor section 162 is located in the web 226 between the guide connecting piece 225 at the "6 o'clock" position and the guide connecting piece 225 at the "7 o'clock" position. There is no conductor section embedded in the web 226 between the "12 o'clock" position and the "2 o'clock" position but in turn there is one in the web 226 between the "12 o'clock" position and the "10 o'clock" position. A further conductor section 162 is embedded between the guide connecting piece 225 at the "2 o'clock" position and that end 227 of the interconnection unit 144 which then merges with the circumferential arc 198 of the conductor section 168 and is guided over the circumference towards the "small" guide connecting piece 225. FIG. 16 shows the connecting contacts 239 (diode head wires) of the current rectifiers 147 and 150.

In FIG. 15, the significance of the abovementioned hook elements 235 becomes clear: the eight hook elements 235 located at the outer circumference 232 of the heat sink 53 lead to a clear positional assignment between the heat sink 53 and the received current rectifiers 147. This provides the possibility of reliably precise positioning of the connecting contacts 239 (diode head wires) of the positive current rectifiers 147 with respect to the connecting contacts 201, 207 and 213 of the interconnection unit 144. In each case two hook elements 235 arranged in pairs are positioned opposite one another such that the two hook elements together with the outer circumference 232 form an undercut. Two mutually opposite hook elements 235 engage behind two undercuts 277, which are integrally formed on the guide connecting piece 225 and, in the plan view shown in FIG. 15, are located on each of the two sides of a connecting contact 183, 186, 189, 192 and 195. With respect to the axis of rotation 26 the undercuts 277 are at least partially at the same axial position as the guide connecting pieces 225.

Figure 17A:
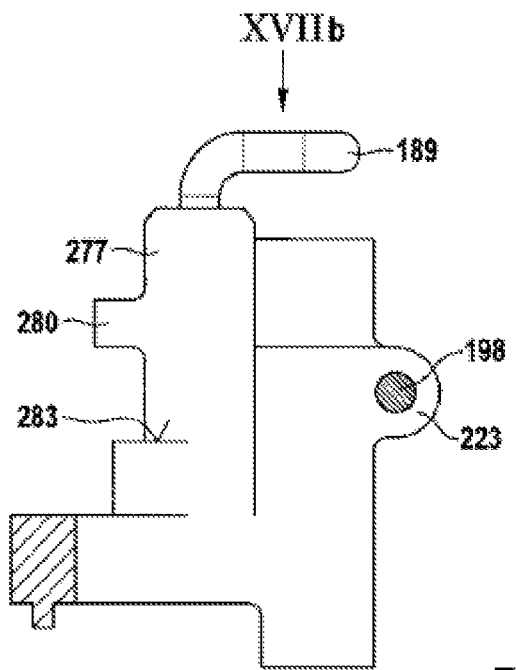
Figure 17B:
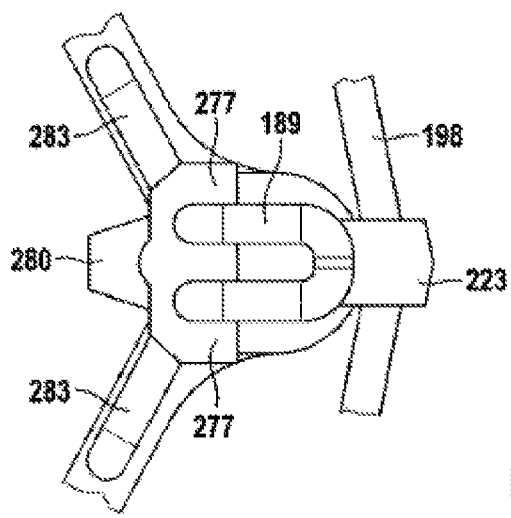
FIG. 17b show a side view and a plan view of a guide connecting piece in accordance with the two exemplary embodiments.

At least part of the guide connecting pieces 225 or the next respective environment thereof has other functions in addition to the task of holding the connecting contacts 180, 183, 186, 189, 192 and 195. Thus, firstly the heat sink 117 needs to be centered with respect to the interconnection unit 144 and held or gripped in the circumferential direction in the correct position. Furthermore, a correct position of the heat sink 117 with respect to the interconnection unit 144 needs to be ensured in the axial direction (axis of rotation 26). This makes it possible, firstly, for the current rectifiers 150 (negative diodes) already located in the receptacles 66 in this fitting step to be brought into the correct position, i.e. to supply the connecting contacts 204, 210 and 216 of the interconnection unit 144 in the correct position. This is achieved by virtue of the fact that a centering shoulder 280 is integrally formed on the guide connecting pieces 225 on a radial inner side of the guide connecting pieces 225 (see also FIGS. 17a and 17b). When the heat sink 117 is fitted onto the interconnection unit 144, this centering shoulder 280 or centering stub protrudes into the stepped recess 250 and very particularly into the small sub-recess 253 (see also FIG. 16). This centering takes effect before the connecting contacts 239 (diode head wires) of the current rectifiers 150 (negative diodes) are supplied into the connecting contacts 204, 210 and 216 of the interconnection unit 144 in the correct positions. Preferably, the centering by means of the centering shoulder 280 or centering stub takes effect even when the heat sink 117 has assumed its end position on the platform 283; but this does not necessarily need to be the case any more because diode head wires have then usually already been threaded into the corresponding connecting contacts. In this end position, the ribs 244 and 247 are arranged on the right and left, respectively, of a guide connecting piece 225 and bring about a positionally correct assignment of the heat sink 117 with respect to the guide connecting piece 225 in the circumferential direction. Optional pins and/or snap-action hooks on the interconnection unit 144 or the webs 226 are directed towards the heat sink 117 and additionally engage in openings in order to keep the heat sink 117 on the interconnection unit 144 at least with frictional engagement and/or form-fitting engagement.

A structural unit 284 comprising the heat sink 53, in the example three insulating sleeves 156, three spacers 246 and three rivets 159 (tubular rivets), together with, in the example, three positive current rectifiers 147 (positive diodes) and the B+ bolt 153 is preassembled. In this case, first the positive current rectifiers 147 (positive diodes) are brought close to the receptacles 66 in order to be received (press-in diodes are pressed into the receptacles 66 in the form of cylindrical holes). The connecting contacts 239 (diode head wires) therefore protrude through the holes 74. Preferably, the three spacers 246 are then positioned onto that side of the heat sink 53 on which the connecting contacts 239 (diode head wires) can be seen and on which contact is to be made with said connecting contacts. The stepped insulating sleeves 156 are plugged into the holes 74 from the other side (upper side) and then in each case one spacer 246, one insulating sleeve 156 and one rivet 159 (tubular rivet) are fastened to one another at or in a hole 74. A collar 286 of the rivet 159 then bears against a step 289 of the insulating sleeve 156 or against an end face 292 of a spacer 246. This structural unit 284 is then positioned on the heat sink 117, with the result that the collar 286 of the rivet 159 comes to bear in a cylindrical depression 238 in the heat sink 117. The hook elements 235 in the process engage in each case around the undercuts 277 integrally formed on the guide connecting piece 225 in the described manner. At the same time, the connecting contacts 239 (diode head wires) of the positive current rectifiers 147 are guided towards the connecting contacts 201, 207 and 213 of the interconnection unit 144 and connected thereto.

Figure 19:
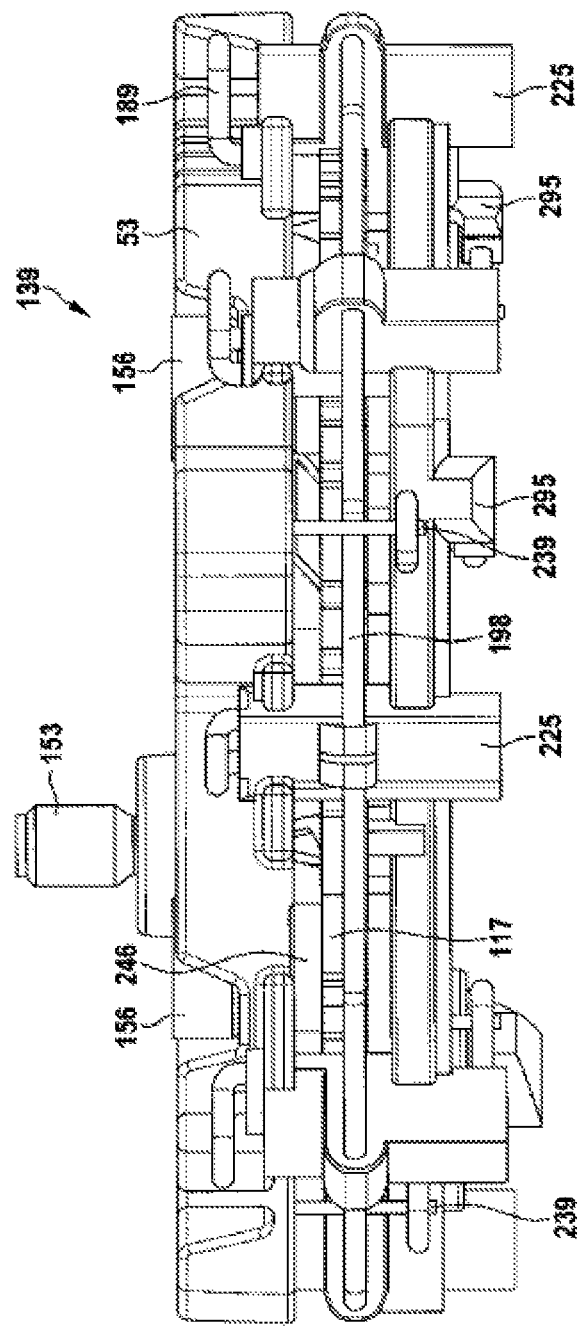
FIG. 19 shows a side view of the rectifier device in accordance with the second exemplary embodiment.

FIG. 19 shows a side view (perpendicular to the axis of rotation 26) of the design of the cooling device or the rectifier. This side view shows, in the case of the interconnection unit 144, emanating from the webs 226 and protruding downward, i.e. protruding away from the heat sink 117 on the side remote from the heat sink 117, platforms 295, which can also be seen in the view from below in FIG. 16. While the connecting contacts 201, 207 and 213 extend radially outwards and emanate from the webs 226 in the plane of said webs, the wire is bent back (downward) in the axial direction (direction of rotation 26) and in the direction pointing away from the heat sink 53 in the webs 226 in order to extend radially inwards and so as to emerge out of the platforms 295 after a certain distance.

Figure 18:
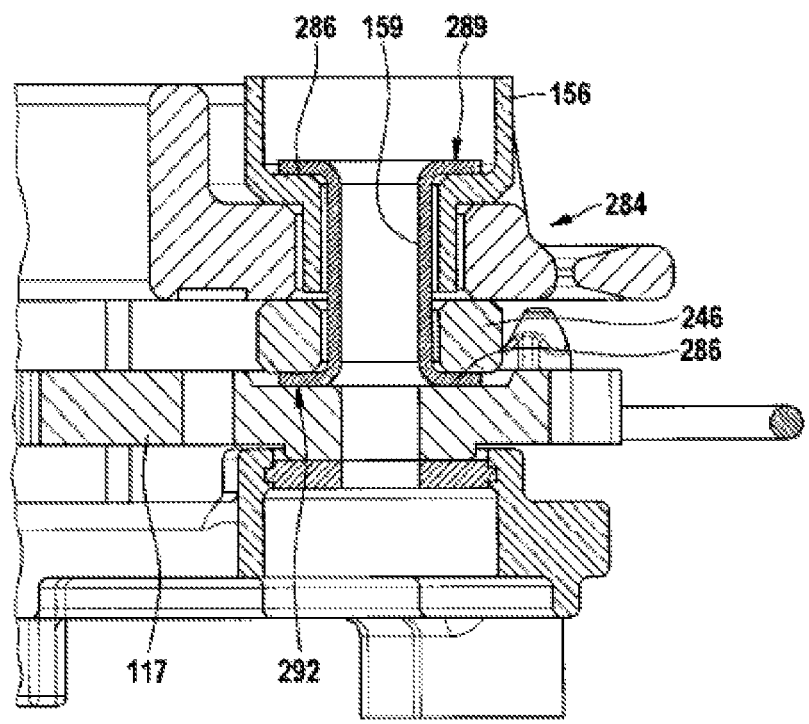
FIG. 18 shows a basic sectional view through the layer structure in accordance with the two exemplary embodiments.

FIG. 20 shows a three-dimensional illustration of the end frame 13.2. This end frame 13.2 shows three fixing connecting pieces 298 (screw-type connecting pieces with an internal thread) which are used for receiving the rectifier device 139 for fixing to the end frame 13.2. For this purpose, the resting faces 301, 304 and 307 illustrated in FIG. 16 which are round and have a hole in the center (insert parts consisting of metal; see also FIG. 18) are positioned onto in each case one fixing connecting piece 298. In this case, the resting face 301 which is positioned next to the threaded sleeve 78 is placed onto the fixing connecting piece 298 which is depicted on the right in FIG. 20. The resting face 304 which is arranged between the two other resting faces 301 and 307 is positioned onto the central of the three fixing connecting pieces 298. Several slot-shaped air exit openings 308 are located over the outer circumference of the end frame 13.2.

The guide connecting pieces 225 illustrated in FIGS. 15 and 16 are inserted into openings 228, 313, 316, 319, 322 and 325 as follows, with reference to FIG. 16: as already described in relation to FIG. 11, the small guide connecting piece 225 is inserted into the opening 228 which is arranged axially (axis of rotation 26) beneath the controller. This opening is introduced between a fixing connecting piece 328 (screw-type connecting piece with internal thread) and a dam 331 in the end region 334 of the end frame 13.2. The controller 231 is held by the fixing connecting piece 328. Correspondingly, the other guide connecting pieces 225 are inserted into said openings successively.

A hub 337 is integrally formed centrally on the end frame 13.2, with the bearing 28 being inserted into said hub (see FIG. 1). This hub is in this case connected with four struts 340 to the end region 334 of the end frame 13.2. Four large openings 40 are located between the struts 340 and the end region 334, through which openings cooling air is sucked, caused by the movement of the fan 30 during operation of the generator or the electrical machine 10. Three of these openings 40 are provided with continuous recesses 346, which are introduced on the radially outer edge 349. The platforms 295 of the interconnection unit 144 protrude into these recesses 346 in such a way that they are at a common axial level (axis of rotation 26). That is to say that the platform 295 and possibly the connecting wire 216 extend in a plane formed from the openings (main openings) 40, said connecting wire 216 then extending exclusively in this plane, for example. The form of the platforms 295 and the form of the recesses 346 are matched to one another. This means that the platforms 295 fill the recesses 346 completely or almost completely. One advantage of this arrangement is a usable opening 40 which is as large as possible with, where possible, a small effective edge proportion of the opening 40. This has the effect that boundary effects induced by flow mechanics, such as interfaces reducing the cooling air throughput, for example, are formed to a lesser extent. Furthermore, at least one opening 40 (in this case three) adjoins a planar end-face region 352, which is lower than other end-face regions 355, when viewed axially from the outside. This has the advantage that, despite the web 226 possibly resting thereon, a relatively large gap is produced between the web 226 and the end frame 13.2, with this gap reducing the flow resistance and thereby increasing the air throughput. In the case of a three-phase electrical machine 10, three recesses 346 would be populated by corresponding platforms 295, as in the case described here. In the case of a five-phase machine, five recesses 346 would be occupied by corresponding platforms 295. However, it is not necessarily the case that one recess 346 needs to be provided per platform 295.

Figure 22:
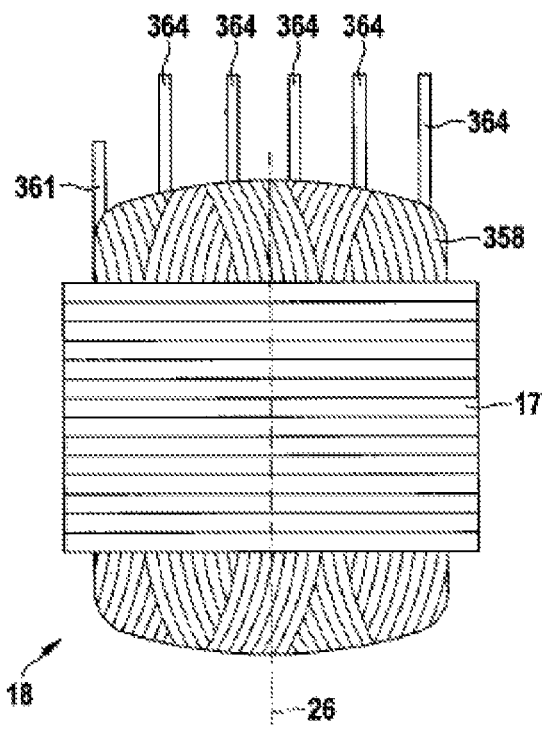
FIG. 22 shows a stator in a side view.

The short guide connecting piece 225 already mentioned above necessitates a markedly shorter, preferably axial extent (axis of rotation 26) or length than the other stator terminals 364 on the side of the stator 16 with its stator core 17, in whose slot a stator winding 18 with individual phase windings 358 is inserted (FIG. 22) at one stator terminal 361. Markedly shorter means, for example, 20 mm difference in length (for example installed state in the electrical machine). In the context of the present design, there is therefore a stator terminal 361 in the short guide connecting piece 225 beneath the controller 231, while the other, in this case five, stator terminals 364 are inserted into the other (long) guide connecting pieces 225. All of the stator terminals 361 and stator terminals 364 extend in the axial direction (axis of rotation 26), for example in the guide connecting pieces 225.

The second exemplary embodiment described from FIG. 13 onwards has an inner crosspiece 87, which is arranged with respect to the axis of rotation 26 and at the same circumferential position on a larger radius than the inner edge 367. This means that a central opening 370 of the rectifier device 139 is enlarged in the manner of a funnel away from the end frame 13.2 axially outwards.

In all of the exemplary embodiments, the bases 373 shown of the current rectifiers 147 and 150 illustrated by way of example as press-in diodes are directed away from the end frame 13.2.

The heat sink 53 is produced integrally from a metal or a metal alloy by means of a pressure casting process. Aluminum or an aluminum alloy is used for this purpose. The same materials are used for the heat sink 117.

The invention claimed is:

1. An electrical machine (10), with a housing (13), which has at least one end frame (13.2), with a rectifier device (139), which has an interconnection unit (144), which interconnects current rectifiers (147, 150) to form a bridge circuit, characterized in that the interconnection unit (144) has at least one platform (295), which is oriented towards the end frame (13.2) and openings (40) are separated by at least one strut (340), which holds a hub (337), one opening (40) having a recess (346), which is introduced at the radially outer edge (349) of the opening (40), and the platform (295) protruding into the recess (346), and a connecting wire (216), which emerges out of the platform (295), extending into the opening (40).

2. The electrical machine (10) as claimed in claim 1, characterized in that the connecting wire (216) extends in a plane formed from the openings (40).

3. The electrical machine (10) as claimed in claim 1, characterized in that a form of platforms (295) and a form of the recesses (346) are matched to one another.

4. The electrical machine (10) as claimed in claim 1, characterized in that platforms (295) fill the recesses (346) at least almost completely.

5. The electrical machine (10) as claimed in claim 1, characterized in that at least one opening (40) adjoins a planar end-face region (352), which is lower than other regions, when viewed axially from an outside.

6. The electrical machine (10) as claimed in claim 1, characterized in that the connecting wire (216) extends exclusively in a plane formed from the openings (40).

7. The electrical machine (10) as claimed in claim 6, characterized in that a form of platforms (295) and a form of the recesses (346) are matched to one another.

8. The electrical machine (10) as claimed in claim 7, characterized in that platforms (295) fill the recesses (346) at least almost completely.

9. The electrical machine (10) as claimed in claim 8, characterized in that at least one opening (40) adjoins a planar end-face region (352), which is lower than other regions, when viewed axially from an outside.

10. The electrical machine (10) as claimed in claim 1, characterized in that the machine is an AC generator.

* * * * *

UNITED STATES PATENT AND TRADEMARK OFFICE
CERTIFICATE OF CORRECTION

PATENT NO. : 8,686,609 B2  Page 1 of 1
APPLICATION NO. : 13/496934
DATED : April 1, 2014
INVENTOR(S) : Furthmueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 197 days.

Signed and Sealed this
Twenty-ninth Day of September, 2015

Michelle K. Lee
*Director of the United States Patent and Trademark Office*